United States Patent [19]
Ishii

[11] Patent Number: 5,559,721
[45] Date of Patent: Sep. 24, 1996

[54] MULTI-MEDIA INFORMATION TRANSFER SYSTEM

[75] Inventor: Toshio Ishii, Kawasaki, Japan

[73] Assignee: Fujitsu Limited, Kawasaki, Japan

[21] Appl. No.: 973,293

[22] Filed: Nov. 9, 1992

[30] Foreign Application Priority Data

Nov. 11, 1991 [JP] Japan ................... 3-294280

[51] Int. Cl.$^6$ .................................. H04N 1/00
[52] U.S. Cl. ................ 364/514 A; 358/402; 358/442; 358/468; 379/100
[58] Field of Search ................. 364/514; 379/90, 379/88, 89, 93, 96, 100; 348/14; 358/400, 402, 442, 406, 468

[56] References Cited

U.S. PATENT DOCUMENTS

| 4,972,462 | 11/1990 | Shibata | 379/89 |
| 5,095,445 | 3/1992 | Sekiguchi | 364/514 OR |
| 5,339,156 | 8/1994 | Ishii | 358/402 |

FOREIGN PATENT DOCUMENTS

| 182347 | 10/1983 | Japan . |
| 286363 | 12/1987 | Japan . |
| 270438 | 12/1991 | Japan . |

OTHER PUBLICATIONS

Postel et al., "An Experimental Multimedia Mail System", ACM Transaction on Office Inf. Sys.; vol. 6, No. 1 pp. 63–81; Jan. 1988.

Yamamoto, "Multi-media electronic mail", Image Commu. and Workstations,; vol. 1258; pp. 2–9; 1990.

Primary Examiner—Emanuel T. Voeltz
Assistant Examiner—Kamini Shah
Attorney, Agent, or Firm—Armstrong, Westerman, Hattori, McLeland & Naughton

[57] ABSTRACT

A multi-media information transfer system transfers information between a computer center and a multi-media mail apparatus which is coupled to a communication network. The multi-media information transfer system includes a first part provided in the computer center and the multi-media mail apparatus for specifying a transfer mode based on an attribute of information which is to be transferred, a second part provided in the multi-media mail apparatus for storing information which is received from the computer center and the communication network, and a third part provided in the computer center and the multi-media mail apparatus for transferring the information between the computer center and the multi-media mail apparatus in the transfer mode specified by the first part. The first part specifies the transfer mode from a general transfer mode in which a plurality of pages are transferred together in response to one instruction of a transfer format, a page transfer mode in which the transfer is made one page at a time by instructing the transfer format of each page, and a combined transfer mode in which the general transfer mode and the page transfer modes are combined.

12 Claims, 17 Drawing Sheets (CONTINUED TO FIG.14)

MULTI-MEDIA INFORMATION TRANSFER SYSTEM

BACKGROUND OF THE INVENTION

The present invention generally relates to multi-media information transfer systems, and more particularly to a multi-media information transfer system which transfers multi-media information between a computer center and a multi-media mail apparatus.

In in-plant communication systems, facsimile machines are becoming used as computer terminals by sending information which is stored in the computer to the facsimile machine and entering information received by the facsimile machine into the computer.

On the other hand, the reduction of the cost of the facsimile machines has brought revolutionary effects to general homes. It has now become possible to make access to the computer center from an inexpensive facsimile machine for home use, so as to receive various kinds of services such as at-home banking and at-home reservation.

Accordingly, there are demands to realize an efficient information transfer between the computer center and the facsimile machine.

Conventionally, when making information transfer between the computer center and various terminal equipments such as the facsimile and a telephone set, a multi-media mail apparatus is interposed therebetween so that image information and voice information can be transferred efficiently.

FIG. 1 shows an example of a conventional multi-media information transfer system which uses the multi-media mail apparatus.

In FIG. 1, a multi-media mail apparatus 1 includes a computer communication controller 10, a facsimile/telephone (FAX/TEL) communication controller 11, a call controller 12, a data transfer controller 14, a medium judging part 16, a medium converter 17 and a subscriber data storage 18. The operation of each part of the multi-media mail apparatus 1 will be described later.

A computer center 2 shown in FIG. 1 is coupled to a scanner 3, a high-resolution display unit 4 and a printer 5. This computer center 2 exchanges data such as the transmitting/receiving condition and the message (image/text) between the computer communication controller 10 of the multi-media mail apparatus 1.

A public telephone network 8 exchanges data such as the message (image), push-button (PB) signal and mark sheet between the FAX/TEL communication controller 11 of the multi-media mail apparatus 1. A facsimile machine 6, a telephone set 7 and the like are coupled to the public telephone network 8.

FIGS. 2 and 3 are sequence diagrams showing the multi-media information transfer in the multi-media information transfer system shown in FIG. 1. A description will now be given of the conventional multi-media information transfer, by referring to FIGS. 1 through 3. In the following description, the numbers in round brackets "( )" respectively correspond to the numbers in the round brackets shown in FIGS. 2 or 3.

[A] When sending computer image information to the facsimile machine 6 (FIG. 2):

(1) An operator of the computer center 2 reads a document into the computer by use of the scanner 3. This operator instructs the computer to transmit this document to the facsimile machine 6 by manipulating a console (not shown).

(2) The computer center 2 transmits a "communication start request" to the multi-media mail apparatus 1. The "communication start request" includes information such as the kind of service (facsimile transmission) and the destination (b).

(3) The computer communication controller 10 of the multi-media mail apparatus 1 starts the call controller 12 when the "communication start request" is received. The call controller 12 refers to the subscriber data storage 18, and checks whether or not a service with respect to the computer is possible. If the service can be made, the call controller 12 transmits a "communication start accept" to the computer center 2 via the computer communication controller 10, and establishes a logical path.

(4) The computer center 2 transmits a "mode set request" to the multi-media mail apparatus 1 when the "communication start accept" is received. The "mode set request" notifies the multi-media mail apparatus 1 of the parameters such as the page number and the medium classification (binary image, text, mixed) of the data amounting to one page which is transmitted thereafter.

(5) The computer communication controller 10 of the multi-media mail apparatus 1 starts the call controller 12 when the "mode set request" is received. Because the logical path is established, the call controller 12 starts the data transfer controller 14.

The data transfer controller 14 checks the parameters of the "mode set request" such as the medium classification and the page number, and transmits a "mode set accept" to the computer center 2 via the call controller 12 and the computer communication controller 10 if the parameters are normal.

(6) The computer center 2 makes a "data transfer" amounting to one page with respect to the multi-media mail apparatus 1 when the "mode set accept" is received.

(7) The computer communication controller 10 of the multi-media mail apparatus 1 starts the data transfer controller 14 via the call controller 12 when the "data transfer" is received. The data transfer controller 14 starts the medium judging part 16, and the medium classification within the page (hereinafter simply referred to as an in-page medium classification) of the "data transfer" is judged.

In this example, the medium classification is the binary image, and no medium conversion is necessary. However, if the medium classification is the text, the medium converter 17 is started so as to convert the text into the image.

The data transfer controller 14 transmits a "reception acknowledge" to the computer center 2 via the call controller 12 and the computer communication controller 10 at every transition of the in-page medium classification and every time the in-page end data is normally received. Thereafter, steps (8) through (11) which are respectively the same as the steps (4) through (7) described above are carried out.

(12) When the "data transfer" amounting to all pages ends, the computer center 2 transmits a "communication end request" to the multi-media mail apparatus 1.

(13) The computer communication controller 10 of the multi-media mail apparatus 1 starts the call controller 12 when the "communication end request" is received. The call controller 12 transmits a "communication end acknowledge" to the computer center 2 via the computer communication controller 10, and releases the logical path. The computer center 2 also releases the logical path when the "communication end acknowledge" is received.

(14) The call controller of the multi-media mail apparatus 1 starts the FAX/TEL communication controller 11. The FAX/TEL communication controller 11 sends the image message received from the computer center 2 to the facsimile machine 6 via the public telephone network 8.

The process of sending the computer image information to the facsimile machine 6 is completed by the above described operation.

[B] When entering facsimile image information into the computer (FIG. 3):

(1) A user of the facsimile machine 6 transmits a message to the multi-media mail apparatus 1 in accordance with a man machine interface (MMI) of the multi-media mail apparatus 1. The information which is transmitted includes "kind of service=computer transmission", "destination=a", "subscriber ID=b" and the like. The FAX/TEL communication controller 11 of the multi-media mail apparatus 1 starts the subscriber data storage 18 before receiving the message and checks whether or not the service with respect to the facsimile subscriber can be accepted. If it is possible to accept the service, the message is received by the multi-media mail apparatus 1.

(2) The FAX/TEL communication controller 11 of the multi-media mail apparatus 1 stores the received message into a file which is not shown, and starts the call controller 12. The call controller 12 transmits a "communication start instruction" to the computer center 2 via the computer communication controller 10.

(3) The computer center 2 transmits a "communication start accept" to the multi-media mail apparatus 1 if the communication can be started when the "communication start instruction" is received, and establishes a logical path.

(4) The computer communication controller 10 of the multi-media mail apparatus 1 starts the call controller 12 when the "communication start accept" is received, and the call controller 12 starts the data transfer controller 14. The data transfer controller 14 transmits a "mode set instruction" to the computer center 2 via the call controller 12 and the computer communication controller 10.

(5) The computer center 2 checks the medium classification, the page number and the like when the "mode set instruction" is received, and returns a "mode set accept" to the multi-media mail apparatus 1 if the checked information is normal.

(6) The computer communication controller 10 of the multi-media mail apparatus 1 starts the data transfer controller 14 via the call controller 12 when the "mode set accept" is received. The data transfer controller 14 reads from the file the message which is received from the facsimile machine 6, and makes a "data transfer" amounting to one page to the computer center 2 via the call controller 12 and the computer communication controller 10.

(7) The computer center 2 returns a "reception acknowledge" to the multi-media mail apparatus 1 when the data amounting to one page is normally received. Thereafter, steps (8) through (11) which are respectively the same as the steps (4) through (7) described above are carried out.

(12) The data transfer controller 14 of the multi-media mail apparatus 1 transmits a "communication end instruction" to the computer center 2 via the call controller 12 and the computer communication controller 10 when the "reception acknowledge" corresponding to the "data transfer" related to the last page is received from the computer center 2.

(13) The computer center 2 returns a "communication end acknowledge" to the multi-media mail apparatus 1 when the "communication end instruction" is received, and releases the logical path. The operator of the computer center 2 outputs the received data to the printer 5 if necessary. The call controller 12 of the multi-media mail apparatus 1 releases the logical path when the "communication end acknowledge" is received via the computer communication controller 10.

The process of entering the facsimile image information into the computer is completed by the above described operation.

[C] When entering mark sheet or PB signal information into the computer (not shown):

First, when the data is input from the facsimile machine 6 in the mark sheet format, the FAX/TEL communication controller 11 of the multi-media mail apparatus 1 supplies the data to the medium converter 17. The medium converter 17 converts the data into the fixed text format. Numerical data for each item such as the application number are marked on the mark sheet.

Second, when the data is input from the telephone set 7 in the PB signal format, the FAX/TEL communication controller 11 of the multi-media mail apparatus 1 supplies the data to the medium converter 17. The medium converter 17 converts the data into the fixed text format. The conversation process between the telephone set 7 and the multi-media mail apparatus 1 takes a form such that a response is made from the telephone set 7 by the PB signal in response to a voice guidance from the FAX/TEL communication controller 11.

Third, the FAX/TEL communication controller 11 stores the data having the mark sheet or PG signal format into the file when the reception of the data is completed. The FAX/TEL communication controller 11 starts the call controller 12 so as to shift to the phase of establishing the logical path to the computer center 2.

The process carried out thereafter is the same as the above described case [B] where the facsimile image information is entered into the computer, and a description thereof will be omitted.

Therefore, when transmitting a message from the facsimile machine to the computer center in the conventional multi-media information transfer system, the multi-media mail apparatus calls the computer center in real time when the facsimile machine transmits the message to the multi-media mail apparatus and then transmits the message.

In addition, the message transmission is made on a page basis. The medium classification, the page number and the like are notified to the receiving side immediately before transmitting the data of each page.

As a result, the conventional multi-media information transfer system which transfers multi-media information between the computer center and the multi-media mail apparatus suffered from the following problems.

First, the transmitting side must basically transmit the medium classification, the page number and the like to the receiving side immediately before transmitting the data of each page. For this reason, the transfer efficiency is poor if the messages having the same transmitting condition are transmitted by a single medium because the process becomes redundant.

Second, the receiving side is not informed of the message format before receiving the message, and the data transfer is onesidedly transmitted from the transmitting side. For example, it is impossible to cope with demands such as (i) determining whether or not to enter the message after confirming the contents of the first couple of pages, and (ii) transferring the binary image part in one transfer and transferring the text part in pages when transmitting a message in which the binary image and the text coexist.

Third, if the message having the computer center as its destination is transmitted from the facsimile machine to the multi-media mail apparatus, the multi-media mail apparatus calls the computer center immediately and transmits the message. Hence, the scheduling of the transmitting and receiving processes of the computer center cannot be made.

SUMMARY OF THE INVENTION

Accordingly, it is a general object of the present invention to provide a novel and useful multi-media information transfer system in which the problems described above are eliminated.

Another and more specific object of the present invention is to provide a multi-media information transfer system for transferring information between a computer center and a multi-media mail apparatus which is coupled to a communication network, comprising first means, provided in the computer center and the multi-media mail apparatus, for specifying a transfer mode from a general transfer mode in which a plurality of pages are transferred together in response to one instruction of a transfer format, a page transfer mode in which the transfer is made one page at a time by instructing the transfer format of each page, and a combined transfer mode in which the general transfer mode and the page transfer modes are combined based on an attribute of information which is to be transferred, second means, provided in the multi-media mail apparatus, for storing information which is received from the computer center and the communication network, and third means, provided in the computer center and the multi-media mail apparatus, for transferring the information between the computer center and the multi-media mail apparatus in the transfer mode specified by the first means. According to the multi-media information transfer system of the present invention, it is possible to efficiently transfer the information between the computer center and the multi-media mail apparatus.

Other objects and further features of the present invention will be apparent from the following detailed description when read in conjunction with the accompanying drawings.

DESCRIPTION OF THE PREFERRED EMBODIMENTS

Figure 4:
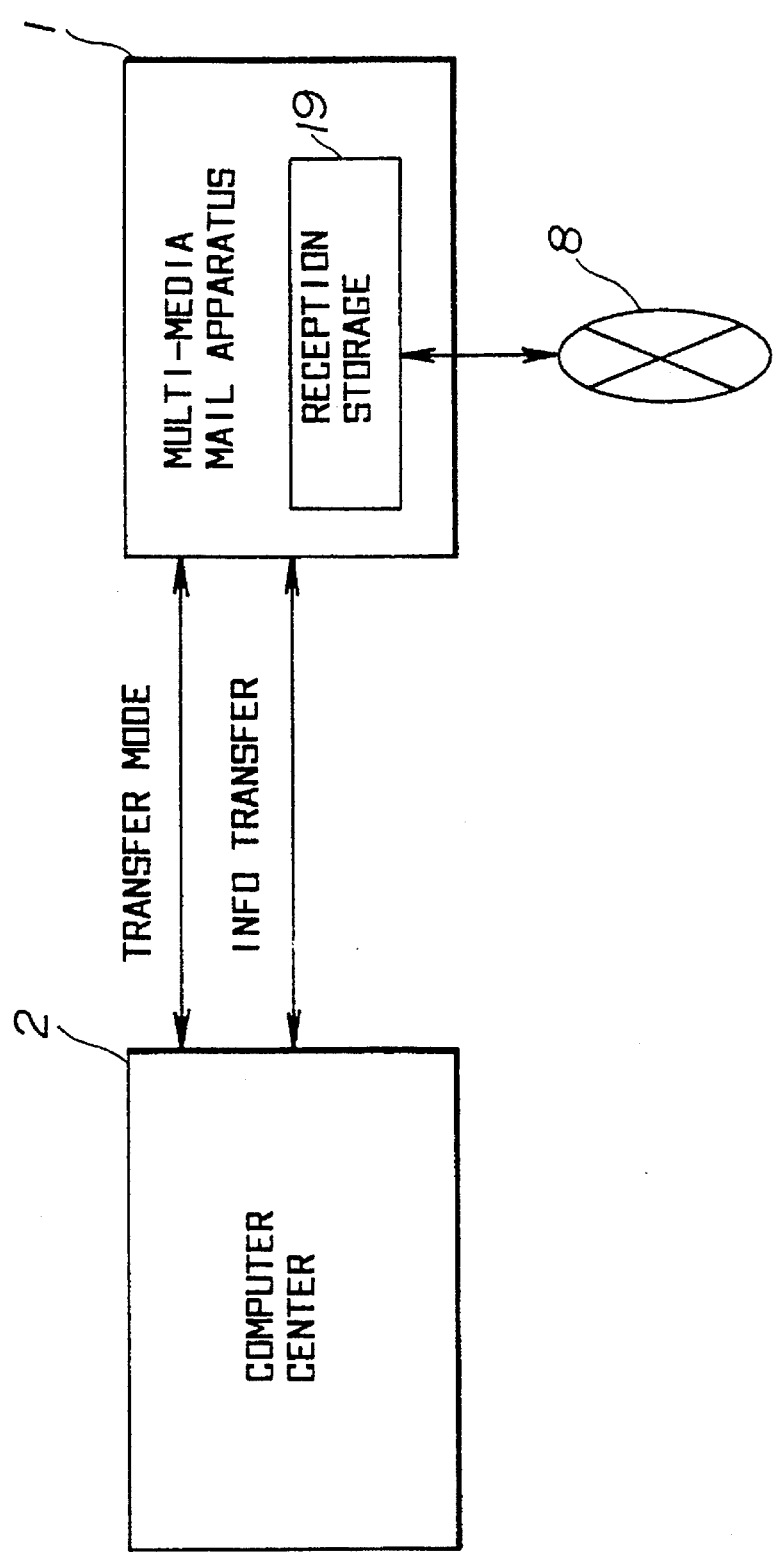
FIG. 4 is a system block diagram for explaining the operating principle of the present invention.

First, a description will be given of the operating principle of the present invention, by referring to FIG. 4. In FIG. 4, a multi-media mail apparatus 1 includes a reception storage means 19 for storing the received message. This multi-media mail apparatus 1 is coupled to a computer center 2 and to a communication network 8.

This system has a plurality of transfer modes for making the information-transfer in the specified format, and the transfer mode is specified based on the message attribute. The transfer modes include a general transfer mode in which a plurality of pages are transferred together in response to an instruction of one transfer format, a page transfer mode in which the transfer is made one page at a time by instructing the transfer format of each page, and a combined transfer mode in which the general transfer mode and the page transfer mode are combined.

The information transfer is made by retrieving the message from the reception storage means 19 of the multi-media mail apparatus 1 in response to an access from the computer center 2.

The messages having the same medium classification and the same transmitting condition are transferred in the general transfer mode. Hence, the transfer format only needs to be specified once prior to the information transfer. As a result, the processing efficiency and thus the transfer efficiency of the system can be improved.

On the other hand, the information transfer can be made by appropriately combining the page transfer mode and the general transfer mode. Accordingly, an efficient information transfer can be made in a most transfer format most suited for the medium classification of the information which is to be transmitted.

Furthermore, the received message which is stored in the reception storage means 19 of the multi-media mail apparatus 1 can be retrieved by the computer center 2 at an arbitrary timing. Therefore, the scheduling of the transmitting and receiving processes of the computer center 2 can be carried out with ease.

Figure 1:
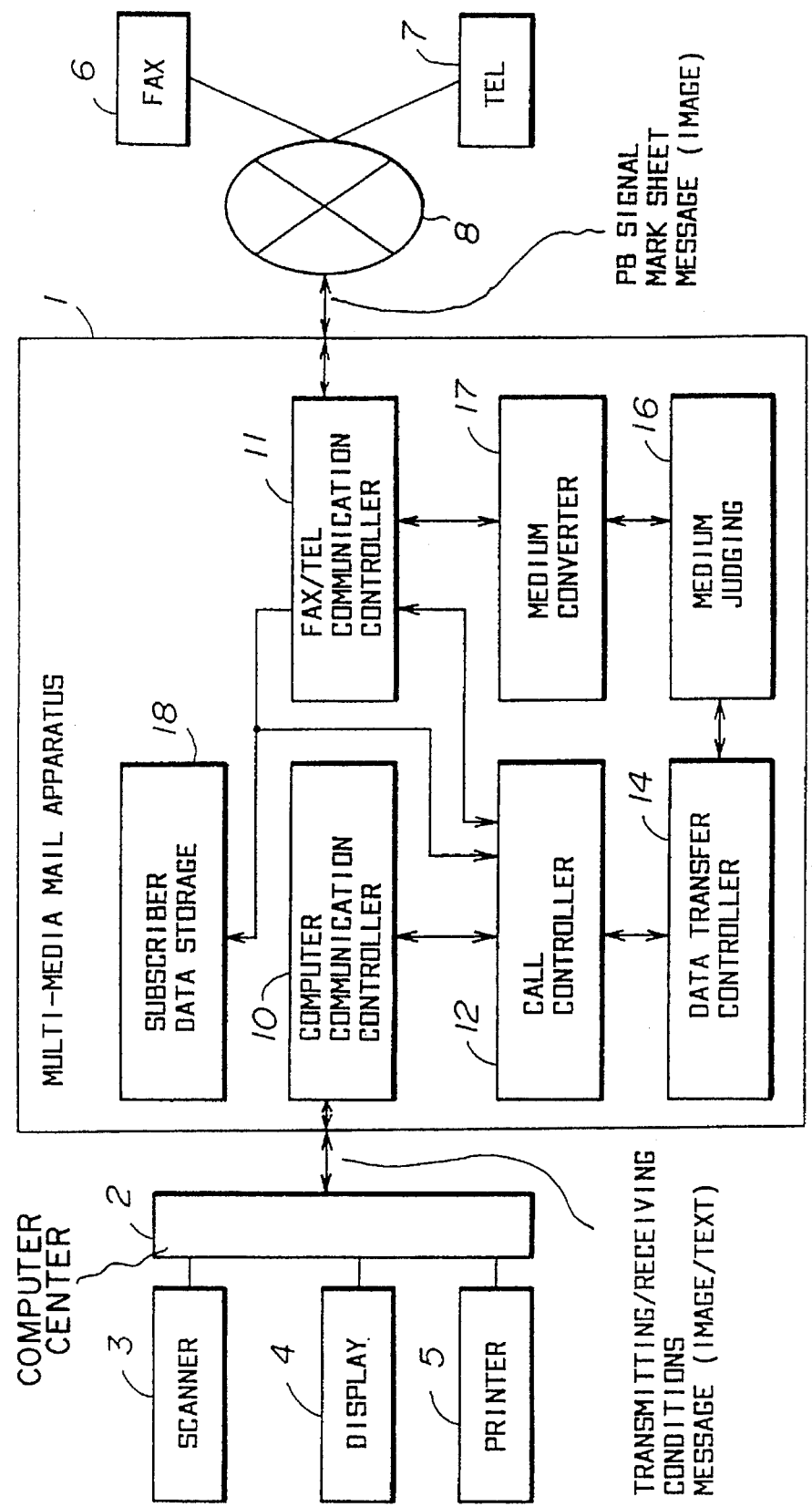
FIG. 1 is a system block diagram showing an example of a conventional multi-media information transfer system.
Figure 2:
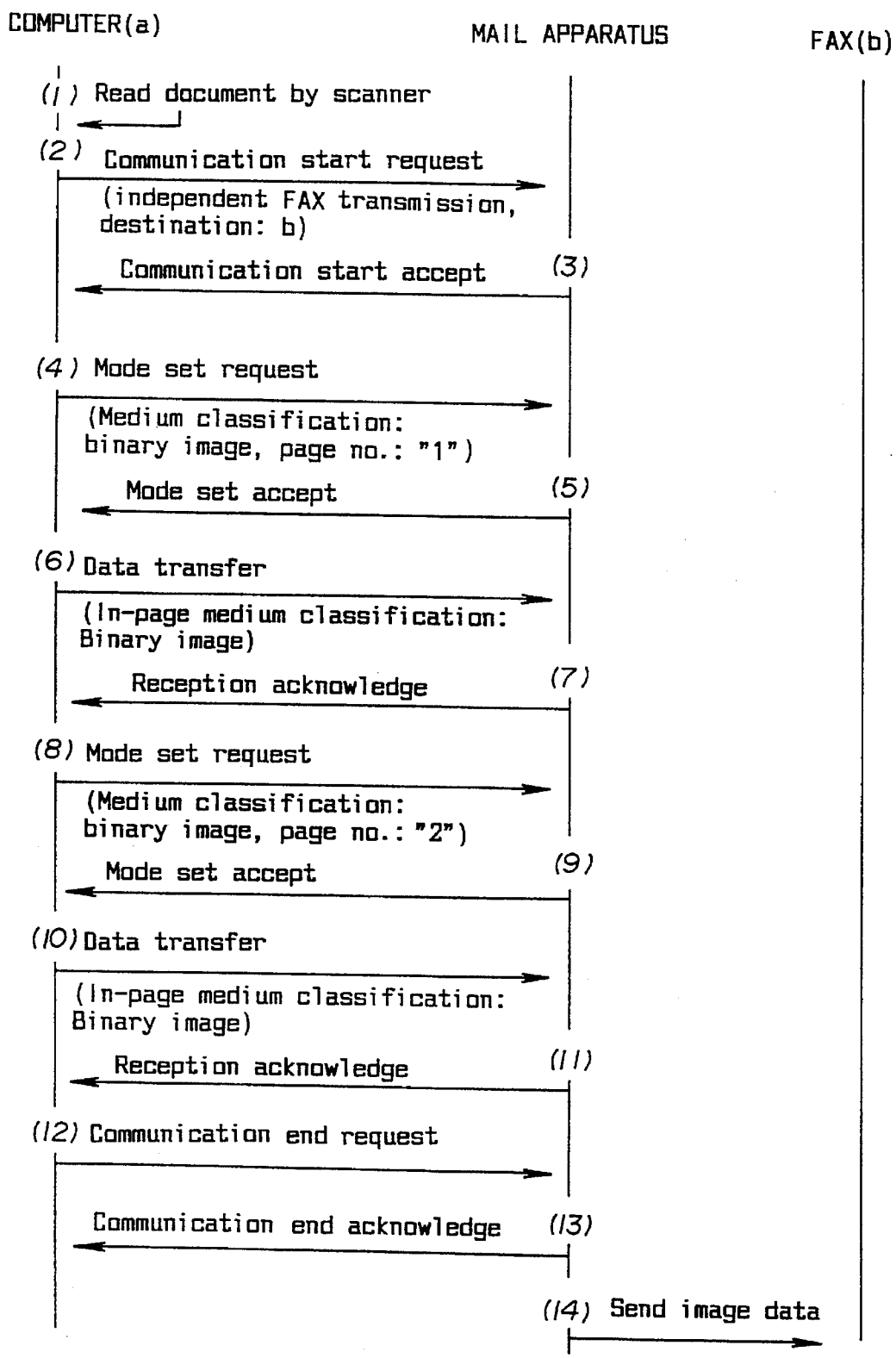
FIGS. 2 and 3 respectively are sequence diagrams for explaining the multi-media information transfer in the multi-media information transfer system shown in FIG. 1.
Figure 3:
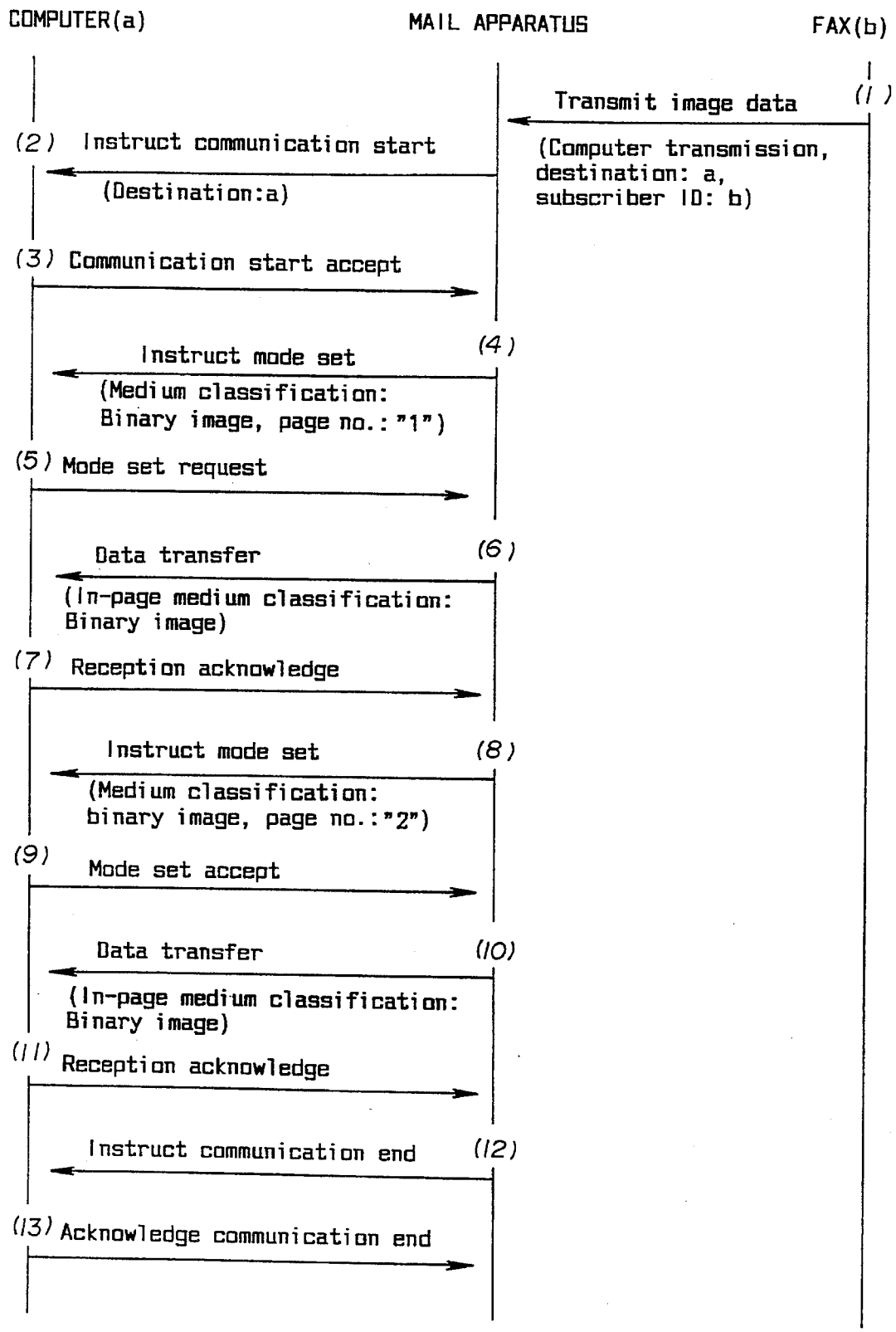
Figure 5:
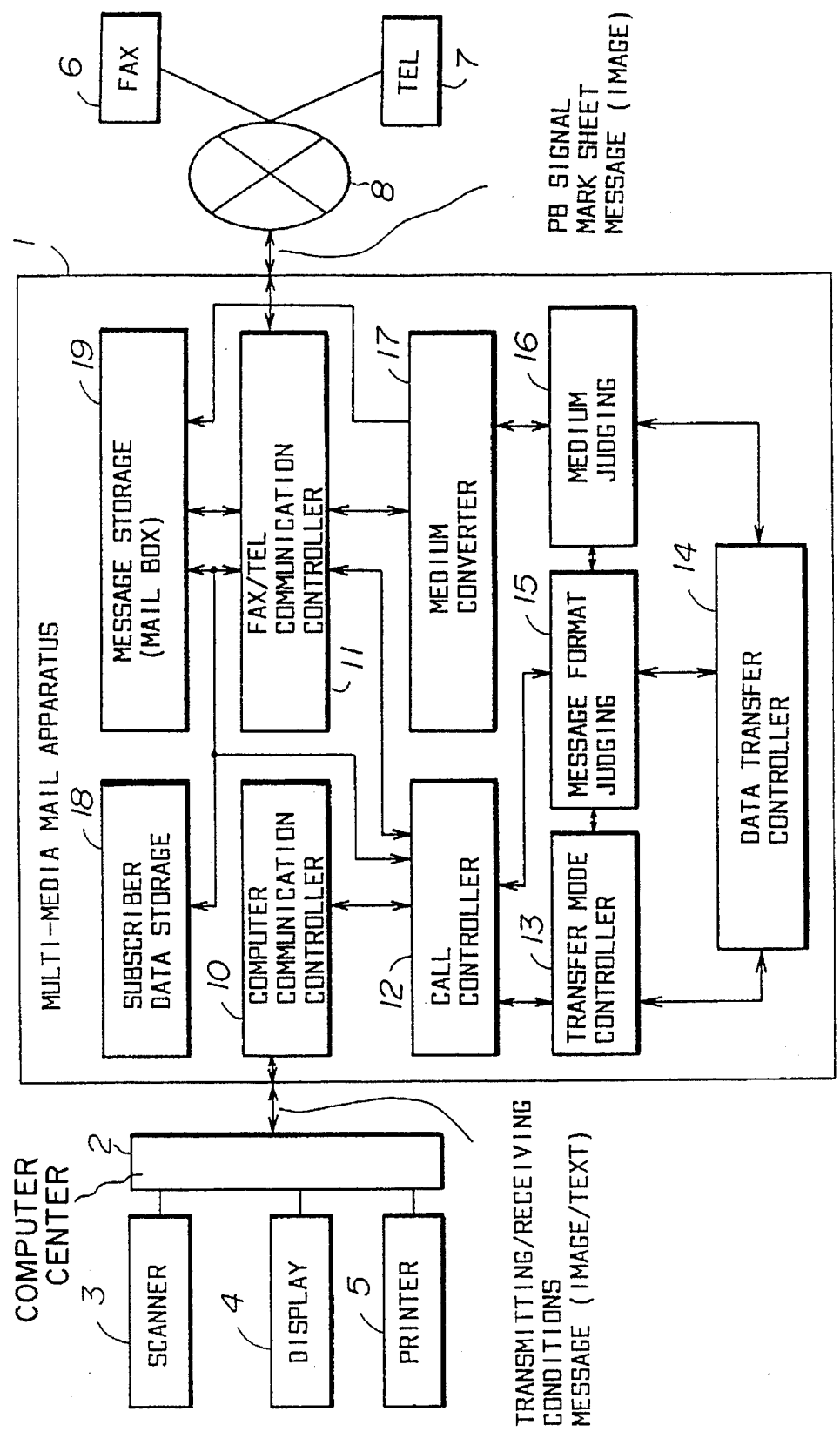
FIG. 5 is a system block diagram showing an embodiment of a multi-media information transfer system according to the present invention.

Next, a description will be given of an embodiment of a multi-media information transfer system according to the present invention, by referring to FIG. 5. In FIG. 5, those parts which are the same as those corresponding parts in FIG. 1 are designated by the same reference numerals.

In FIG. 5, a multi-media mail apparatus 1 includes a computer communication controller 10, a FAX/TEL communication controller 11, a call controller 12, a data transfer controller 14, a message format judging part 15, a medium judging part 16, a medium converter 17, a subscriber data storage 18, and a message storage (mail box) 19. The operation of each part of the multi-media mail apparatus 1 will be described later.

The computer communication controller 10 controls the line connection and the communication between the multi-media mail apparatus 1 and a computer center 2, and exchanges messages and control information between the computer center 2.

The FAX/TEL communication controller 11 controls the line connection and the communication between the multi-media mail apparatus 1 and a facsimile machine 6 and a telephone set 7. This FAX/TEL communication controller 11 exchanges image information between the facsimile machine 6, and exchanges PB signal and/or voice guidance between the telephone set 7.

The call controller 12 controls the setting and releasing of a logical path between the multi-media mail apparatus 1 and the computer center 2. The transfer mode controller 13 controls the transfer mode between the multi-media mail apparatus 1 and the computer center 2 based on the message format.

The data transfer controller 14 checks the sequence of the data received from the computer center 2 and edits the data to be transmitted to the computer center 2. The message format judging part 15 judges and notifies the message format. The medium judging part 16 judges the medium of the received data. The medium converter 17 subjects the received data to a medium conversion depending on the medium which is handled by a remote terminal.

The subscriber data storage 18 stores subscriber data related to the computer center 2, the facsimile machine 6 and the telephone set 7. The message storage 19 manages a mail box which is allocated for each subscriber ID.

The computer center 2 shown in FIG. 1 is coupled to a scanner 3, a high-resolution display unit 4 and a printer 5. The scanner 3 reads a document, and the high-resolution display unit 4 displays a received message with a high resolution. The printer 5 is used to print the received message. The computer center 2 exchanges data such as the transmitting/receiving condition and the message (image/ text) between the computer communication controller 10 of the multi-media mail apparatus 1.

The facsimile machine 6, the telephone set 7 and the like are coupled to a public telephone network 8. The public telephone network 8 exchanges data such as the message (image), PB signal and mark sheet between the FAX/TEL communication controller 11 of the multi-media mail apparatus 1 and the facsimile machine 6 and the telephone set 7.

FIGS. 6 through 9 are flow charts and FIGS. 10 through 15 are sequence diagrams for explaining the multi-media information transfer in the multi-media information transfer system shown in FIG. 5. In the following description, the numbers in round brackets "( )" respectively correspond to the numbers in the round brackets shown in the related one of FIGS. 10 through 15.

[1] When sending computer image information to the facsimile machine 6:

The operation of sending the computer image information to the facsimile machine 6 in this embodiment will be described with reference to the flow chart shown in FIG. 6 and the sequence diagram shown in FIG. 10.

(1) Step S11: An operator of the computer center 2 reads a document into the computer by use of the scanner 3. This operator instructs the computer to transmit this document to the facsimile machine 6 by manipulating a console (not shown). The computer center 2 stores the document read by the scanner 3 into a file which is not shown as image information.

(2) Step S12: The computer center 2 transmits a "communication start request" to the multi-media mail apparatus 1. The "communication start request" establishes the logical path between the computer center 2 and the multi-media mail apparatus 1, and also notifies the multi-media mail apparatus 1 of the kind of service, data transmitting condition and the like. The parameters of the "communication start request" include the kind of service, a remote address, a confidential/store/priority/time selection, a subscriber ID, a password and the like. The kind of service includes general communication, broadcast communication, stored information transmission, stored information retrieval and the like. The remote address includes a telephone number, the subscriber ID, a broadcast list number and the like.

Figure 6:
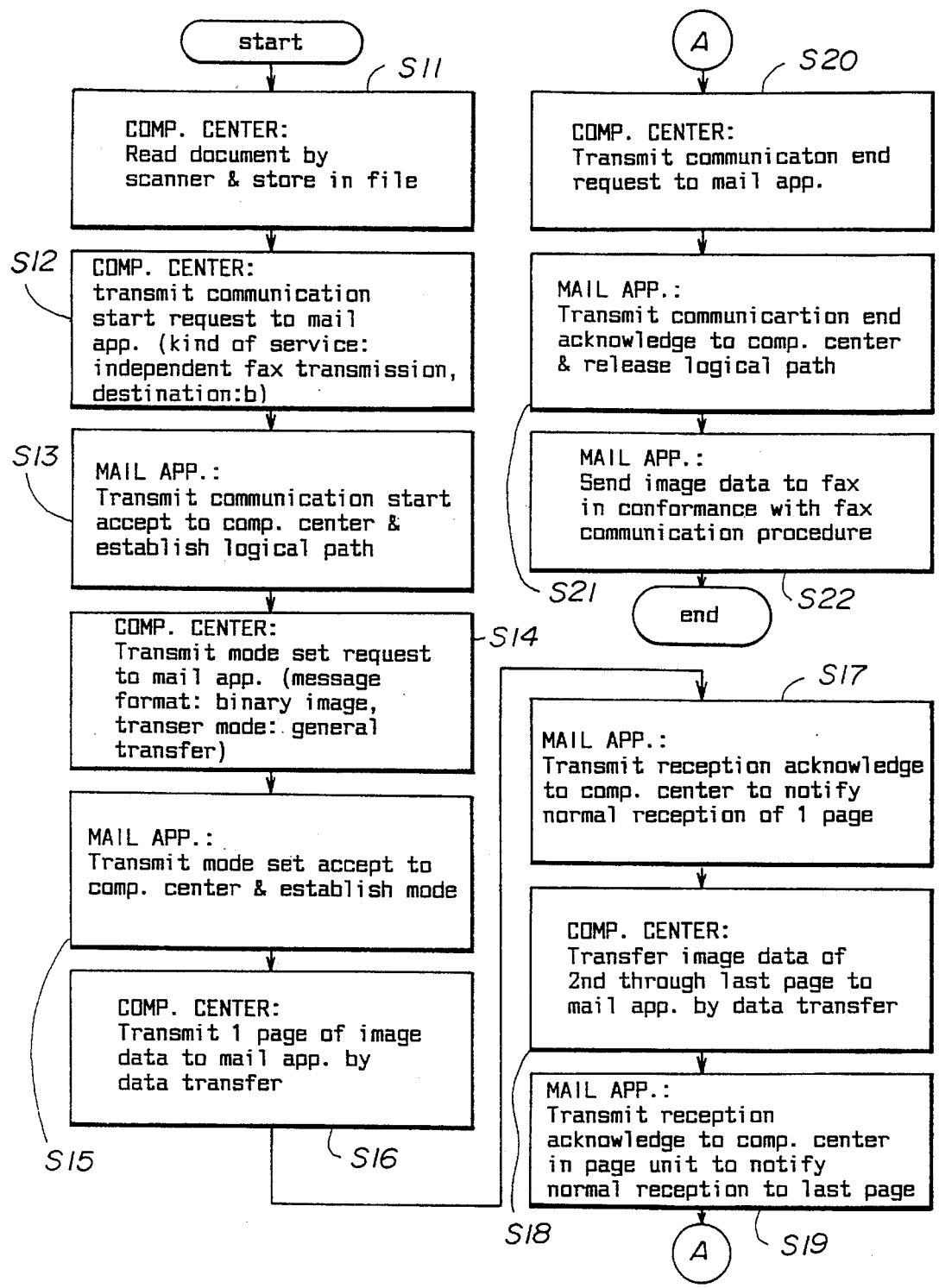
FIG. 6 is a flow chart for explaining the operation of the embodiment when sending computer image information to a facsimile machine.
Figure 10:
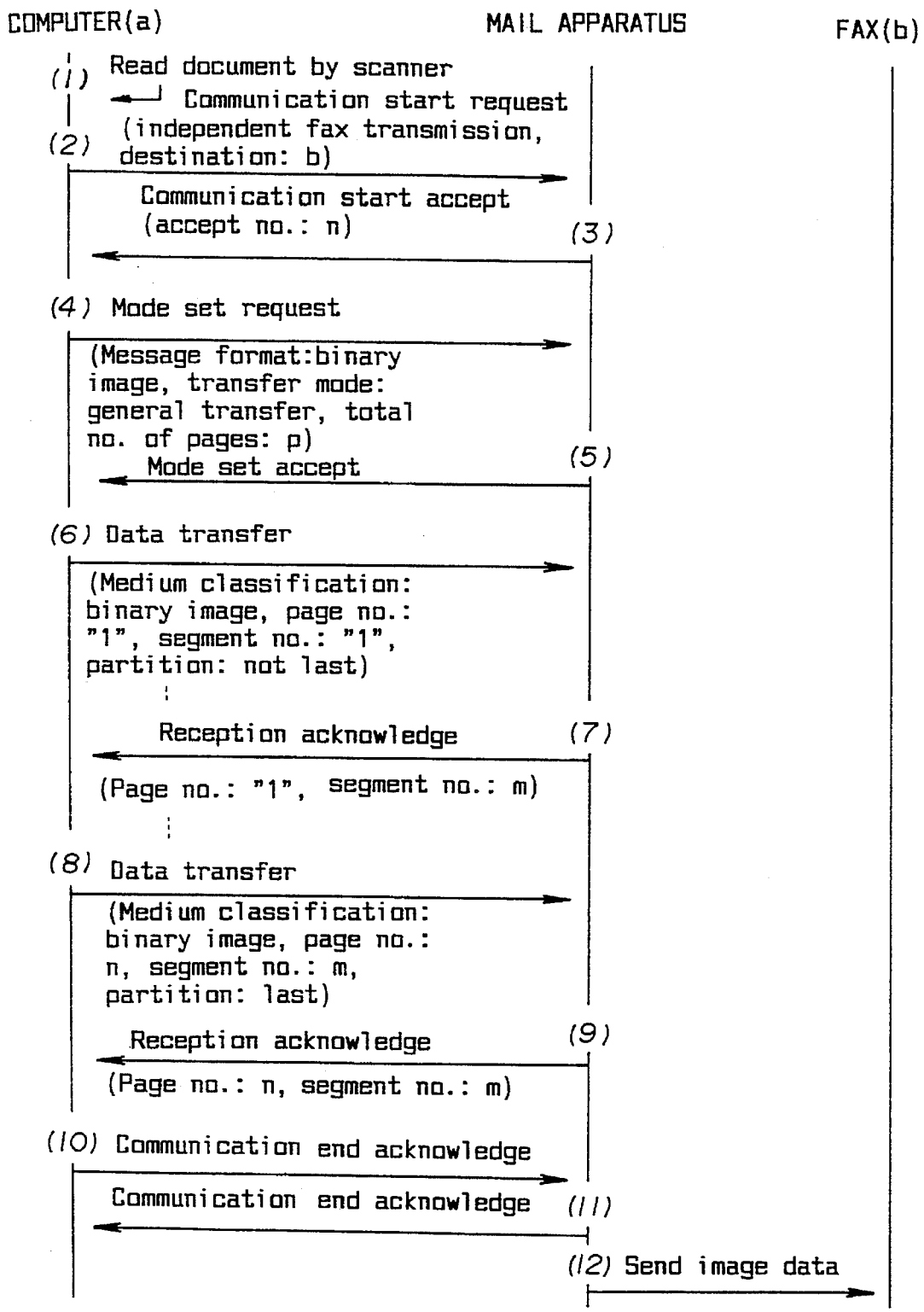
FIG. 10 is a sequence diagram for explaining the operation of the embodiment when sending the computer image information to the facsimile machine.

In FIGS. 6 and 10, it is assumed for the sake of convenience that the kind of service is the general communication (independent transmission to the facsimile machine 6) and that the remote address is the telephone number (b) of the facsimile machine 6.

(3) Step S13: The computer communication controller 10 of the multi-media mail apparatus 1 starts the call controller 12 when the "communication start request" is received. The call controller 12 collates the subscriber ID and the password of the "communication start request" with the data stored in the subscriber data storage 18, and makes an authentication with respect to the subscriber ID (a) of the computer center 2.

If the check result is normal, the other call accept conditions such as changing of the subscriber data, number of reserved transmissions/exceeded reservation capacity and the like are checked. If these check results are also normal, the multi-media mail apparatus 1 returns a "communication start accept" to the computer center 2 via the computer communication controller 10 and establishes a logical path between the multi-media mail apparatus 1 and the computer center 2. The accept number (n) is included in the parameters of the "communication start accept". This accept number (n) is used later when the computer center 2 makes an inquiry of the transmission result of the message.

(4) Step S14: The computer center 2 transmits a "mode set request" with respect to the multi-media mail apparatus 1 when the "communication start accept" is received. The parameters of the "mode set request" include a message format, a transfer mode, a total number of pages of the message, a starting page of the transmission/reception, a medium conversion, a compression technique, a pixel density, a paper size and the like.

The message format includes a binary image, a fixed text, a non-fixed text, and a mixed text. The binary image indicates the data such as the data read by the facsimile machine 6, the scanner 3 and the like. The fixed text indicates the data such as an order sheet information having a fixed format. The non-fixed text indicates the data such as the electronic mail in which the information format is non-uniform.

The transfer mode includes the general transfer mode and the page transfer mode. The general transfer mode is an efficient transfer mode in which one message or a plurality of pages having the same attribute can be transmitted together, where the attribute includes the medium classification, the compression technique, the pixel density, the paper size and the like. According to the general transfer mode, the mode need only be set once with respect to a series of data transfers.

On the other hand, the page transfer mode is used when transferring a message having different attributes for each page or for each segment within the page. The page transfer mode requires the mode to be set for every data transfer amounting to one page.

The data amounting to one page may be transferred in divisions depending on the buffer size. In such a case, each of the divided data groups forming the data which amounts to one page are referred to as one segment.

(5) Step S15: The computer communication controller 10 of the multi-media mail apparatus 1 starts the call controller 12 when the "mode set request" is received. Because the logical path is established, the call controller 12 starts the transfer mode controller 13. The transfer mode controller 13 reads the message format of the "mode set request" and notifies the message format judging part 15 of the read message format.

The transfer mode controller 13 reads the transfer mode of the "mode set request" and makes the preparations for the data reception. In addition, the transfer mode controller 13 returns a "mode set accept" to the computer center 2 via the call controller 12 and the computer communication controller 10, and establishes the mode.

(6) Step S16: The computer center 2 makes a "data transfer" amounting to one page to the multi-media mail apparatus 1 when the "mode set accept" is received.

The parameters of the "data transfer" include the medium classification (binary image/fixed text/non-fixed text), the page number, the in-page segment number, the next medium classification, the next medium page number, the next medium in-page segment number, the partition (not last/last) and the like, and the data part follows these parameters.

The next medium classification, the next medium page number and the next medium in-page segment number are information supplementing the message format notified by the "mode set request". The next medium classification indicates the medium classification of a next medium which appears next to the present medium and is different from the present medium. The next medium page number indicates the page number at which the next medium appears. The next medium in-page segment number indicates the in-page segment number of the next medium.

In this embodiment, the detailed message format is notified appropriately while making the data transfer. Even in the case of the binary image, the attribute within the message may be fixed or variable.

(7) Step S17: The computer communication controller 10 of the multi-media mail apparatus 1 starts the call controller 12 when the "data transfer" is received. The call controller 12 starts the data transfer controller 14 via the transfer mode controller 13. The data transfer controller 14 makes a sequence check of the page number and the in-page segment number of the "data transfer" and notifies the medium classification judging part 16 of the medium classification and the message format judging part 15 of the next medium classification, the next medium page number and the next medium in-page segment number.

If the partition of the "data transfer" is not last (in-page non-last segment), the data transfer controller 14 continues reception of the "data transfer". On the other hand, if the partition of the "data transfer" is the last (in-page last segment), the data transfer controller 14 returns a "reception acknowledge" to the computer center 2 via the transfer mode controller 13, the call controller 12 and the computer communication controller 10, so as to acknowledge the normal reception of the "data transfer".

The parameters of the "reception acknowledge" include the page number and the segment number. The received data is stored in a data file which is not shown in FIG. 5.

(8) Step S18: The computer center 2 transmits the data related to the second and subsequent pages up to the last page to the multi-media mail apparatus 1 in a manner similar to the above when the "reception acknowledge" is received from the multi-media mail apparatus 1.

(9) Step S19: The multi-media mail apparatus 1 returns the "reception acknowledge" to the computer center 2 in a similar manner for every page when the data related to the second and subsequent pages up to the last page are received from the computer center 2, and stores the received data in the data file which is not shown.

(10) Step S20: The computer center 2 transmits a "communication end request" to the multi-media mail apparatus 1 when the "reception acknowledge" with respect to the "data transfer" related to the last page is received from the multi-media mail apparatus 1.

The parameters of the "communication end request" include a result code, sense information and the like. The result code indicates a normal end, a procedure error, a format error or the like. The sense information indicates the detailed cause of the result code.

(11) Step S21: The computer communication controller 10 of the multi-media mail apparatus 1 starts the call controller 12 when the "communication end request" is received. The call controller 12 returns a "communication end acknowledge" to the computer center 2 via the computer communication controller 10, and releases the logical path.

The call controller 12 starts the FAX/TEL communication controller 11, and requests the message received from the computer center 2 to be sent to the facsimile machine 6.

(12) Step S22: The FAX/TEL communication controller 11 calls the facsimile machine 6 via the public telephone network 8, and sends the message within the data file to the facsimile machine 6 in conformance with a facsimile communication procedure.

The process of sending the computer image information to the facsimile machine 6 is completed by the above described operation.

Figure 7A:
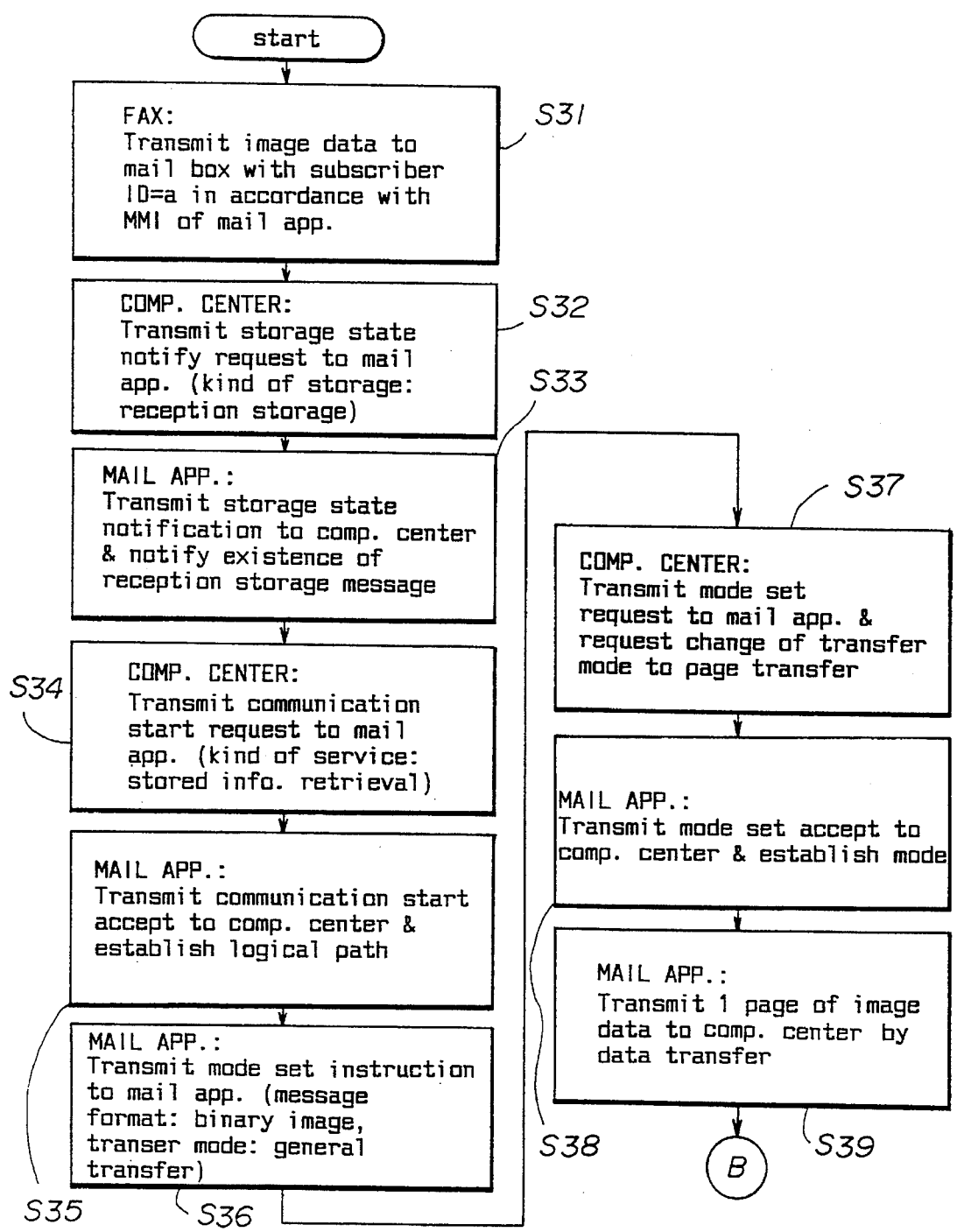
FIGS. 7A and 7B are flow charts for explaining the operation of the embodiment when entering facsimile image information into a computer.
Figure 7B:
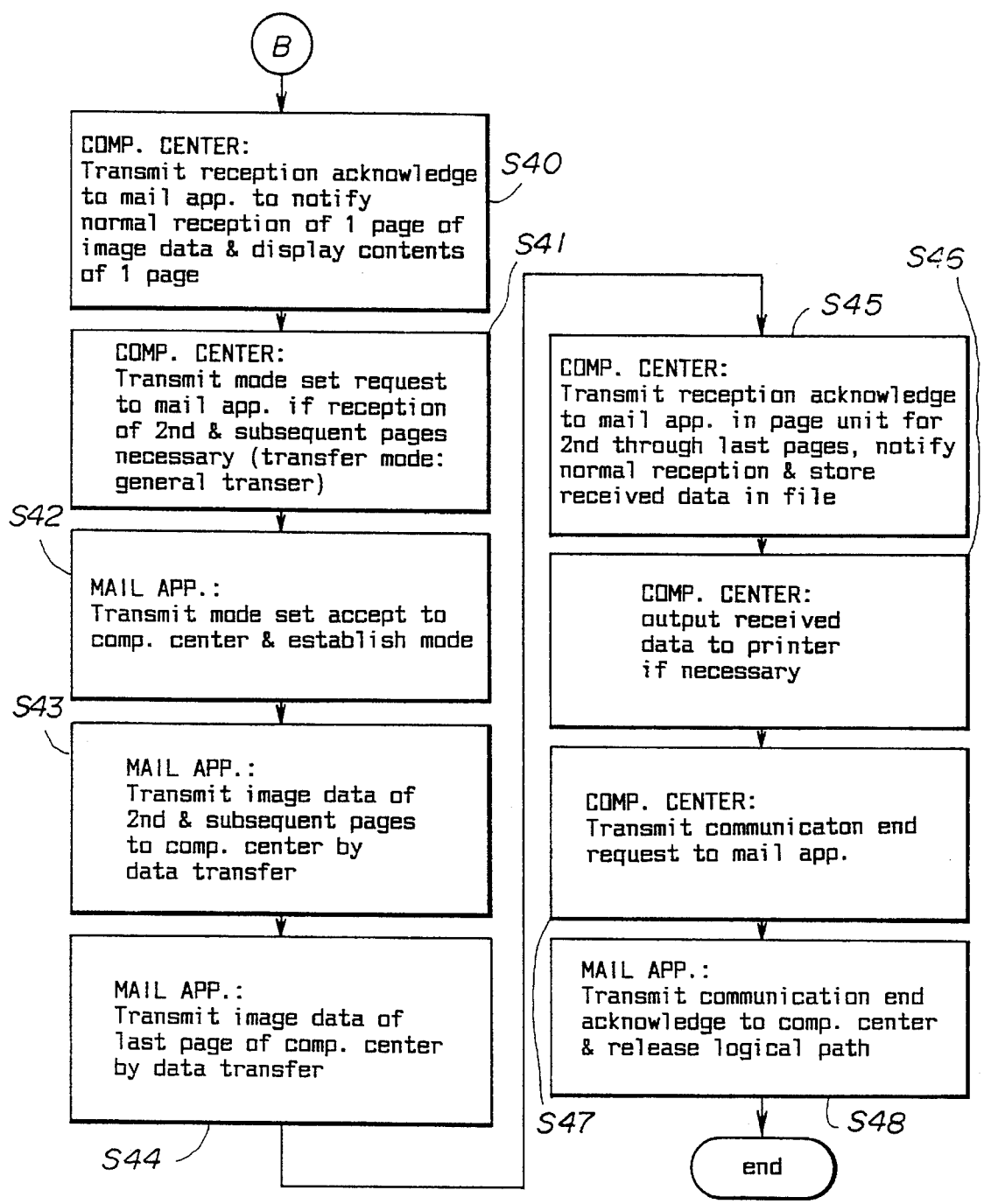
Figure 11:
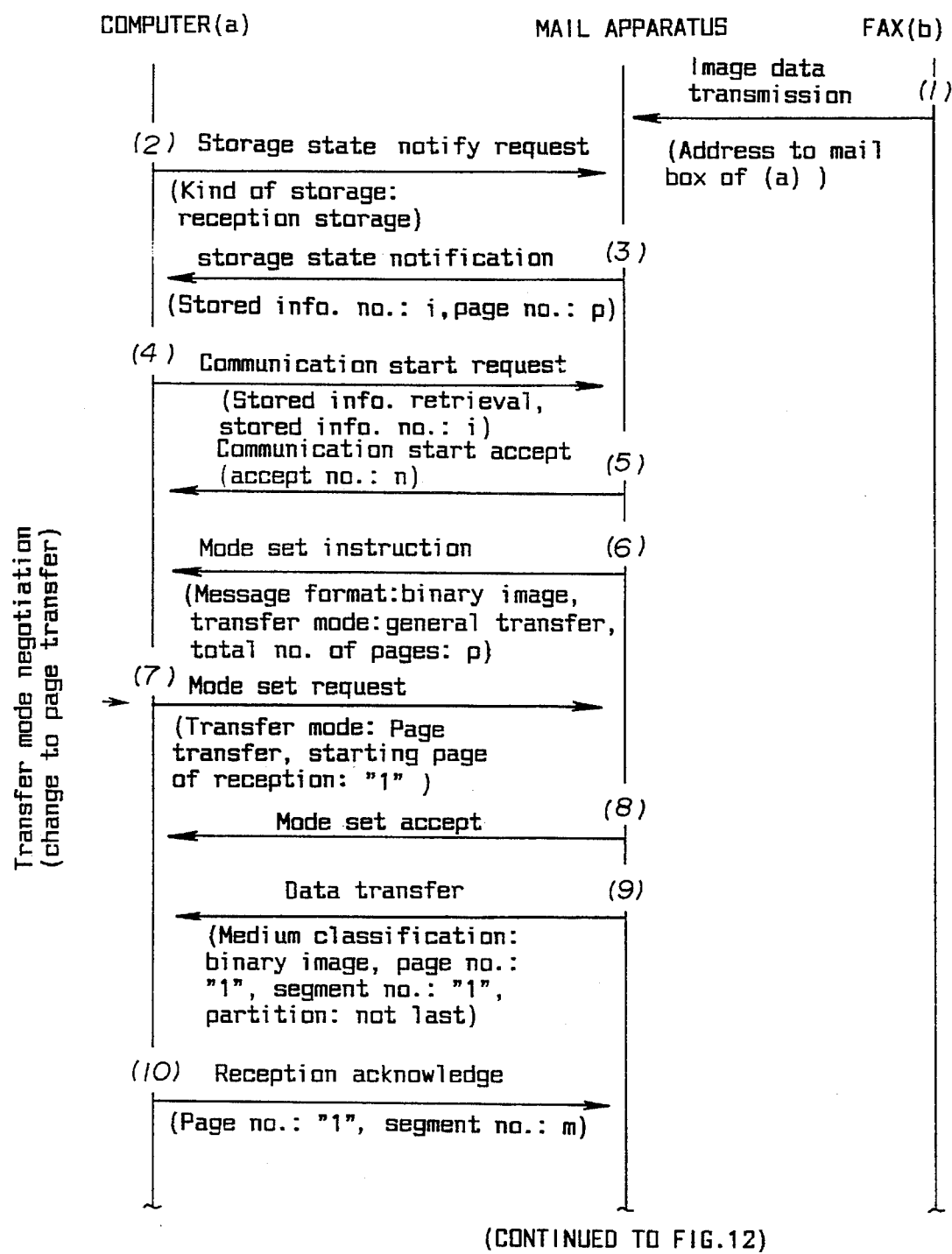
FIGS. 11 and 12 respectively are sequence diagrams for explaining the operation of the embodiment when entering the facsimile image information into the computer.
Figure 12:
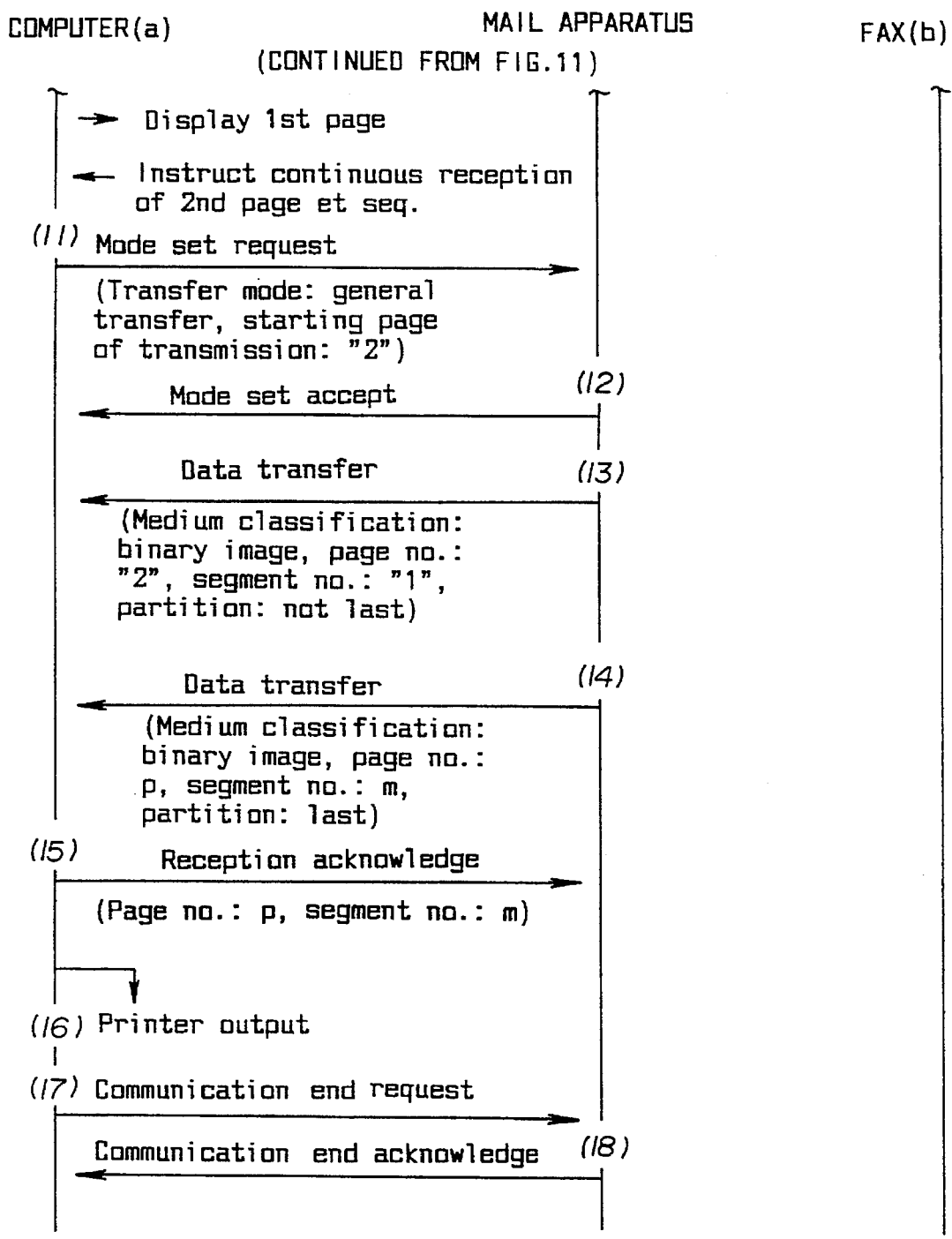

[2] When entering facsimile image information into the computer:

The operation of entering the facsimile image information into the computer in this embodiment will be described with reference to the flow chart shown in FIG. 7 and the sequence diagrams shown in FIGS. 11 and 12.

(1) Step S31: A facsimile subscriber (subscriber ID=b) of the multi-media mail apparatus 1 dials the telephone number of the multi-media mail apparatus 1 from the facsimile machine 6, and connects to the multi-media mail apparatus 1 via the public telephone network 8. The facsimile subscriber inputs the subscriber ID and the password by using the PB signal in accordance with the voice guidance received from the FAX/TEL communication controller 11 of the multi-media mail apparatus 1.

The FAX/TEL communication controller 11 of the multi-media mail apparatus 1 refers to the subscriber data storage 18 and checks whether or not the service is requested from an acceptable subscriber. If the service request is acceptable, the FAX/TEL communication controller 11 requests the facsimile subscriber to further input the function code, destination and the like.

The facsimile subscriber inputs the subscriber ID (a) of the computer center 2 as the destination, and transmits the message from the facsimile machine 6 to the multi-media mail apparatus 1 in conformance with the facsimile communication procedure.

The FAX/TEL communication controller 11 of the multi-media mail apparatus 1 stores the message which is received from the facsimile machine 6 into a mail box which is within the message storage 19 and corresponds to the subscriber ID (a). In addition, the FAX/TEL communication controller 11 notifies the message format judging part 15 of the message format and notifies the medium judging part 16 of the medium classification in page apparatus/segment apparatus, via the call controller 12.

(2) Step S32: The computer center 2 transmits a "storage state notify request" to the multi-media mail apparatus 1 and makes an inquiry to determine whether or not a message addressed to mail box corresponding to the computer center 2 has been received.

The parameters of the "storage state notify request" include the subscriber ID, the password, the kind of storage, the output apparatus and the like. The kind of storage includes a transmission storage indicating storage of data to be transmitted, a reception storage indicating the storage of data received, and confidential indicating storage of confidential data. In this particular case, the reception storage is specified as the kind of storage.

(3) Step S33: The computer communication controller 10 of the multi-media mail apparatus 1 starts the call controller 12 when the "storage state notify request" is received. The call controller 12 checks the normality of the subscriber ID and the password of the "storage state notify request" by referring to the subscriber data storage 18.

If the check result is normal, the call controller 12 retrieves from the message storage 19 the mail box corresponding to the subscriber ID (a), and checks whether or not a message has been received and stored. The call controller 12 edits the retrieval result of the mail box to a "storage state notification" and returns the "storage state notification" to the computer center 2 via the computer communication controller 10.

The parameters of the "storage state notification" include the kind of storage, the number of stored messages, the stored information number, the number of pages, the remote address and the like. In this particular case, it is assumed for the sake of convenience that the kind of storage is the reception storage and that one message is stored.

(4) Step S34: The computer center 2 transmits a "communication start request" to the multi-media mail apparatus 1 when the "storage state notification" is received from the multi-media mail apparatus 1 and it is recognized that one message is stored and that the kind of storage is the reception storage.

The parameters of the "communication start request" include the kind of service (general communication/broadcast communication, stored information transmission/stored information retrieval, etc.), the remote address (telephone number, subscriber ID, broadcast list), the number of stored information transmitted/received, the stored information number, the subscriber ID, the password and the like.

In this particular case, the kind of service is the stored information retrieval and the stored information number is i.

(5) Step S35: The computer communication controller 10 of the multi-media mail apparatus 1 starts the call controller 12 when the "communication start request" is received. The call controller 12 collates the subscriber ID and the password of the "communication start request" with the data stored in the subscriber data storage 18, and makes an authentication with respect to the subscriber ID (a) of the computer center 2.

If the check result is normal, the multi-media mail apparatus 1 returns a "communication start accept" to the computer center 2 via the computer communication controller 10, so as to establish a logical path and to start the transfer mode controller 13.

(6) Step S36: The transfer mode controller 13 transmits a "mode set instruction" to the computer center 2.

The parameters of the "mode set instruction" include the message format (binary image/fixed text/non-fixed text/mixed text), the transfer mode (general transfer/page transfer), the total number of pages of the message, the starting page of the transmission/reception, the medium conversion, the compression technique, the pixel density, the paper size and the like. In this particular case, the message format is the binary image, and the transfer mode is the general transfer mode.

(7) Step S37: If the negotiation of the transfer mode is necessary (that is, a change from the general transfer mode to the page transfer mode is necessary) when the computer center 2 receives the "mode set instruction" from the multi-media mail apparatus 1, the computer center 2 specifies the starting page of the reception and transmits a "mode set request" to the multi-media mail apparatus 1.

In this particular case, there is negotiation of the transfer mode, and the starting page of the reception is 1.

(8) Step S38: The computer communication controller 10 of the multi-media mail apparatus 1 starts the transfer mode controller 13 via the call controller 12 when the "mode set request" is received.

The transfer mode controller 13 returns a "transfer mode accept" to the computer center 2 via the call controller 12 and the computer communication controller 10 if it is recognized that there is negotiation of the transfer mode. In addition, the transfer mode controller 13 establishes the mode, and starts the data transfer controller 14.

(9) Step S39: The data transfer controller 14 of the multi-media mail apparatus 1 reads the reception storage message having the storage information number which is specified by the "communication start request" from the mail box which is within the message storage 19 and corresponds to the subscriber ID (a). In addition, the data transfer controller 14 is notified of the message format from the message format judging part 15 and is notified of the medium classification in page apparatus/segment apparatus from the medium judging part 16.

The data transfer controller 14 sets the starting page of the transmission to 1, and transmits the data amounting to one page to the computer center 2 by a "data transfer" via the transfer mode controller 13, the call controller 12 and the computer communication controller 10.

The parameters of the "data transfer" include the binary image as the medium classification, "1" as the page number, "1 to m" as the segment numbers, don't care as the next medium classification because the next medium classification is the same as the present medium classification, and "0" (don't care) as the next medium page number and the next medium in-page segment number.

(10) Step S40: The computer center 2 displays the received data on the high-resolution display unit 4 and returns a "reception acknowledge" to the multi-media mail apparatus 1 when the "data transfer" amounting to one page is normally received from the multi-media mail apparatus 1.

When the operator of the computer center 2 judges that the second and subsequent pages need to be received in succession to the first page, a continuous reception is instructed from the console which is not shown in FIG. 5.

(11) Step S41: The computer center 2 confirms that the attribute of the received message is the same for the second and subsequent pages, and transmits to the multi-media mail apparatus 1 a "mode set request" which indicates the general transfer mode as the transfer mode and "2" as the starting page of the reception.

(12) Step S42: The computer communication controller 10 of the multi-media mail apparatus 1 starts the the transfer mode controller 13 via the call controller 12 when the "mode set request" is received from the computer center 2.

After confirming the normality of the transfer mode and the starting page of the reception of the "mode set request", the transfer mode controller 13 returns a "mode set accept" to the computer center 2 via the call controller 12 and the computer communication controller 10, and starts the data transfer controller 14.

(13) Step S43: The data transfer controller 14 of the multi-media mail apparatus 1 continuously transmits the data related to the second and subsequent pages by a "data transfer" to the computer center 2 via the transfer mode controller 13, the call controller 12 and the computer communication controller 10.

When the computer center 2 normally receives the data related to the second and subsequent pages from the multi-media mail apparatus 1, the computer center 2 returns a "reception acknowledge" to the multi-media mail apparatus 1 for every page.

(14) Step S44: The data transfer controller 14 of the multi-media mail apparatus 1 transmits the data related to the last page by a "data transfer" to the computer center 2 via the transfer mode controller 13, the call controller 12 and the computer communication controller 10.

(15) Step S45: The computer center 2 returns a "reception acknowledge" to the multi-media mail apparatus 1 and stores the received data in the file when the "data transfer" related to the last page is normally received from the multi-media mail apparatus 1.

The data transfer controller 14 of the multi-media mail apparatus 1 recognizes the completion of the message transmission when the "reception acknowledge" with respect to the "data transfer" related to the last page is received from the computer center 2.

(16) Step S46: The computer center 2 reads the data and outputs the read data to the printer 5 if necessary.

(17) Step S47: The computer center 2 transmits a "communication end request" to the multi-media mail apparatus 1.

(18) Step S48: The computer communication controller 10 of the multi-media mail apparatus 1 starts the call controller 12 when the "communication end request" is received from the computer center 2. The call controller 12 returns a "communication end acknowledge" to the computer center 2 via the computer communication controller 10, and releases the logical path.

The process of entering the facsimile image information into the computer is completed by the above described operation.

Figure 8A:
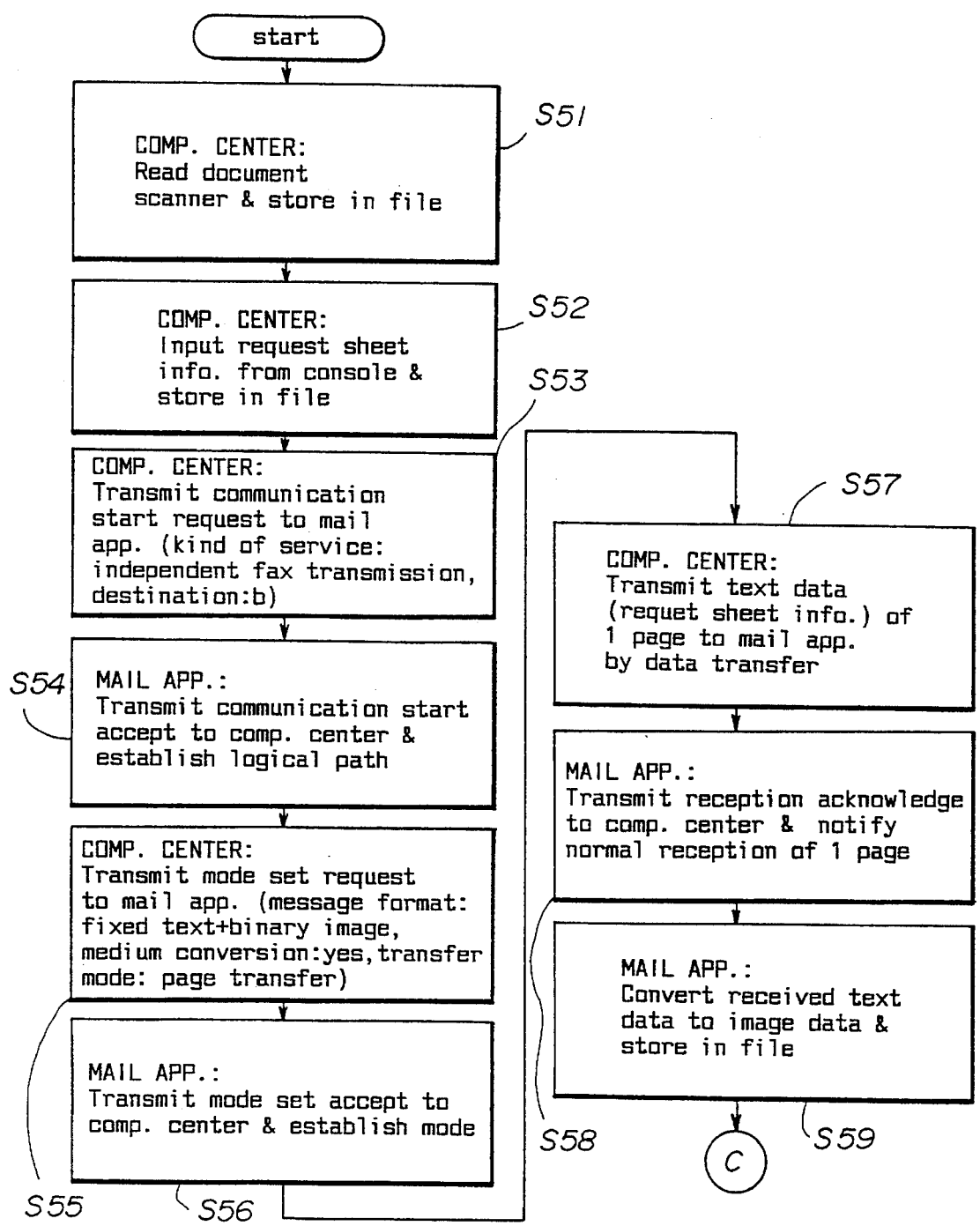
FIGS. 8A and B are flow charts for explaining the operation of the embodiment when sending computer text and image information to the facsimile machine.
Figure 8B:
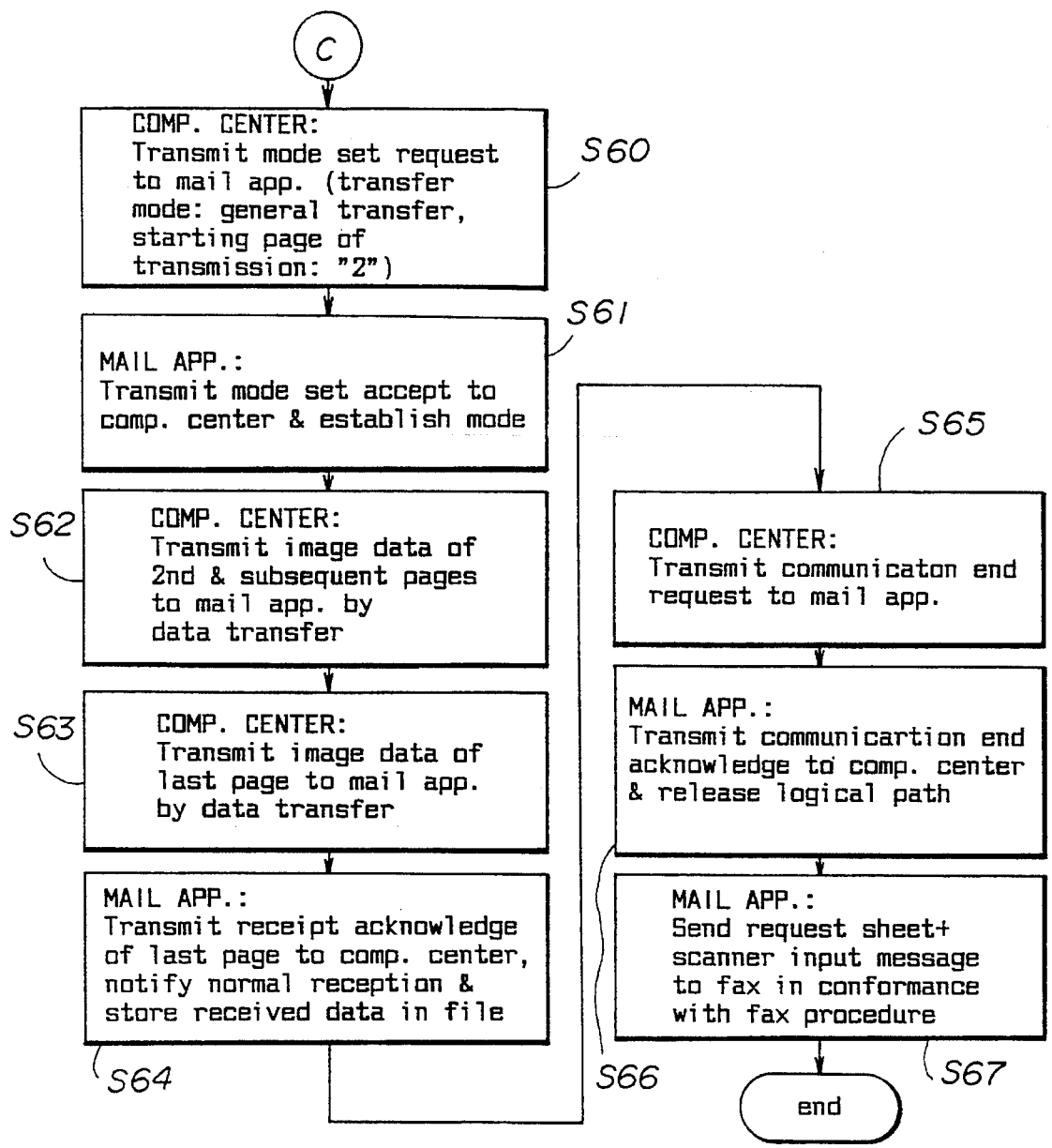
Figure 13:
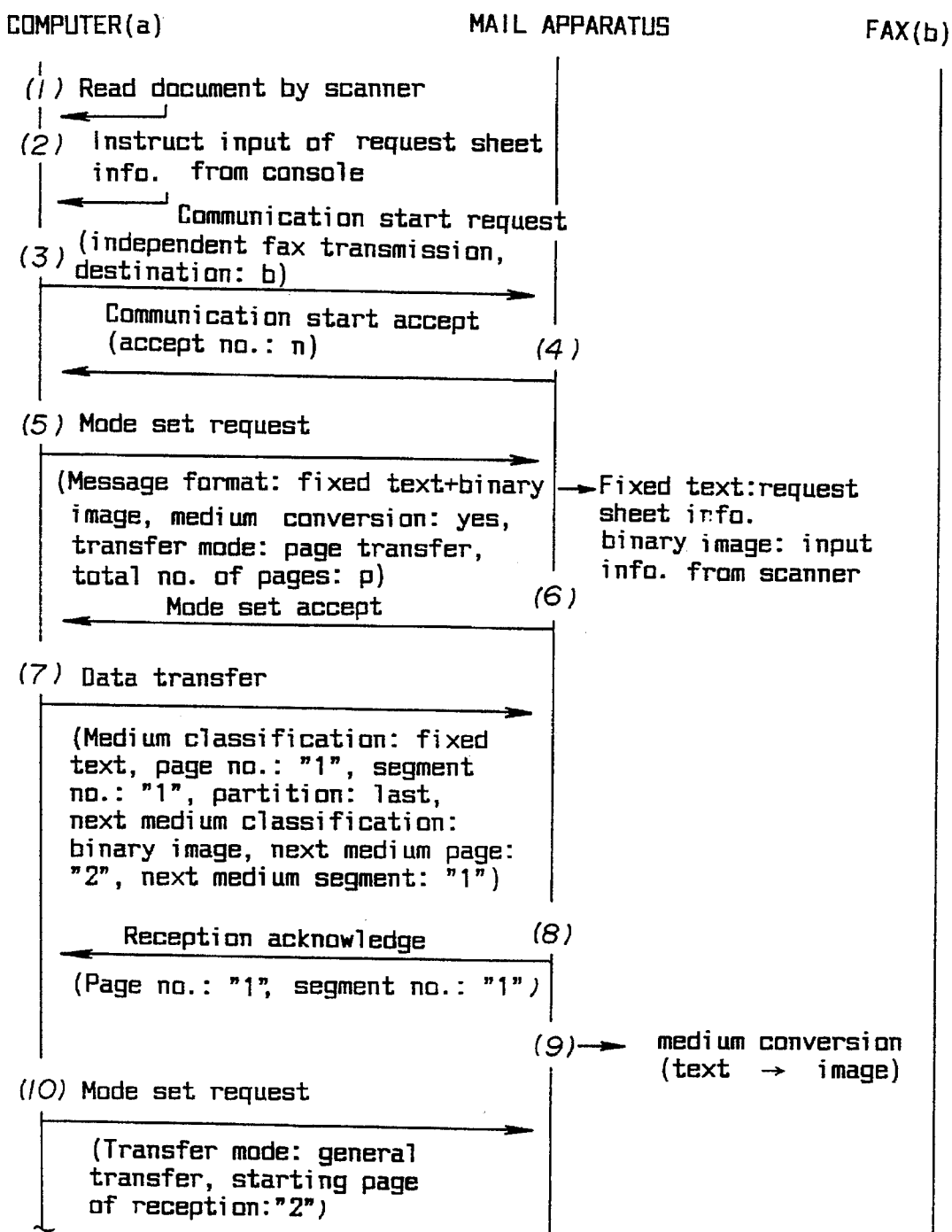
FIGS. 13 and 14 respectively are sequence diagrams for explaining the operation of the embodiment when sending the computer text and image information to the facsimile machine.
Figure 14:
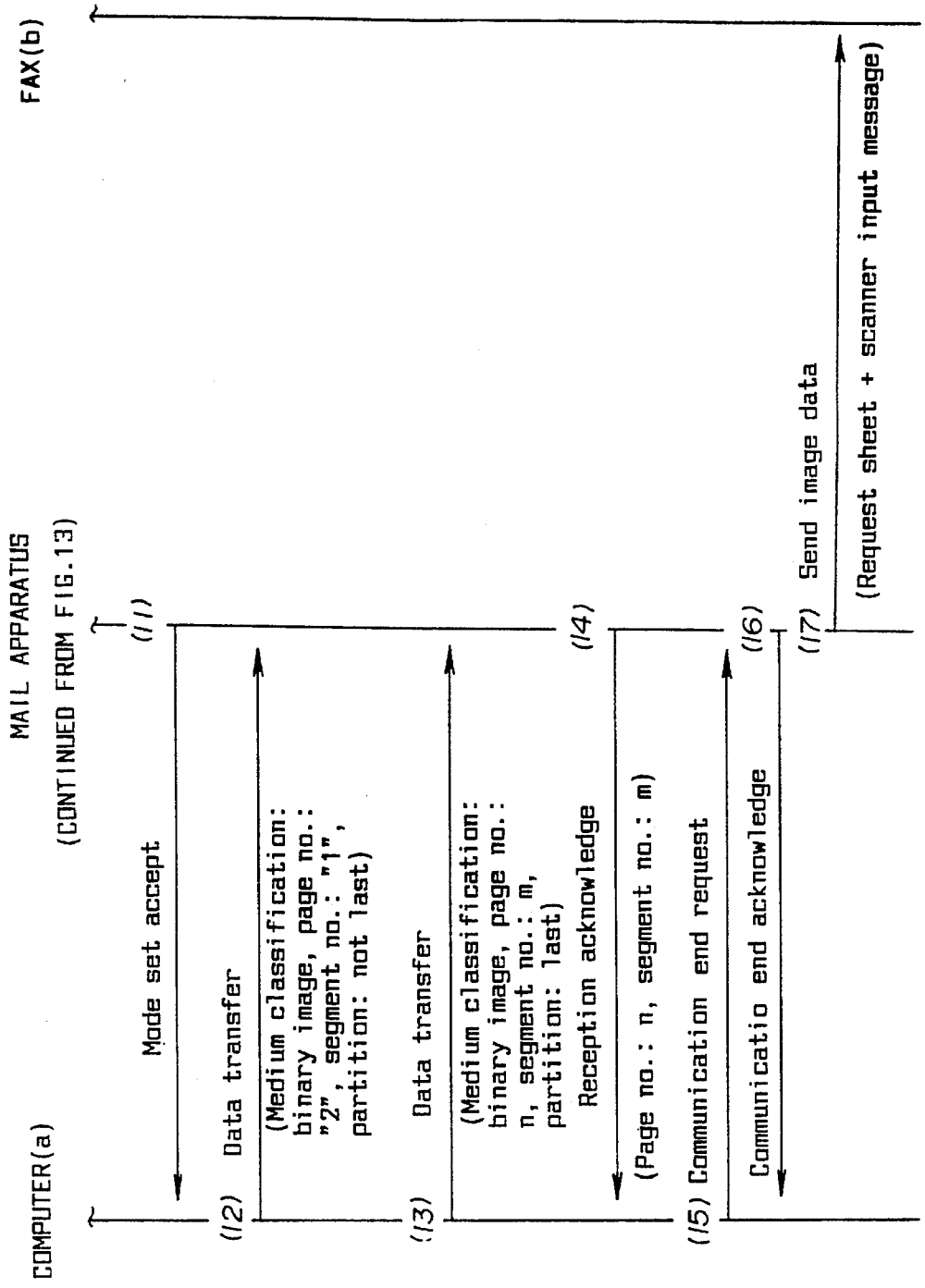

[3] When transmitting computer text and image information to the facsimile machine 6:

The operation of transmitting the computer text and image information to the facsimile machine 6 in this embodiment will be described with reference to the flow chart shown in FIG. 8 and the sequence diagrams shown in FIGS. 13 and 14.

(1) Step S51: The operator of the computer center 2 reads the document into the computer by use of the scanner 3. The computer center 2 stores the document which is read by the scanner 3 into a file which is not shown in FIG. 5 as image information.

(2) Step S52: The operator of the computer center 2 inputs from the console request sheet information addressed to the facsimile subscriber (b) of the multi-media mail apparatus 1. The computer center 2 stores the input document into the file as text information.

(3) Step S53: The computer center 2 transmits a "communication start request" to the multi-media mail apparatus 1.

The parameters of the "communication start request" include the kind of service (general communication/broadcast communication/stored information transmission/stored information retrieval, etc.), the remote address (telephone number, subscriber ID, broadcast list number), the confidential/store/priority/time selection, a subscriber ID, a password and the like.

In this particular case, it is assumed for the sake of convenience that the kind of service is the general communication (independent facsimile communication) and that the remote address is the telephone number (b) of the facsimile machine 6.

(4) Step S54: The computer communication controller 10 of the multi-media mail apparatus 1 starts the call controller 12 when the "communication start request" is received. The call controller 12 collates the subscriber ID and the password of the "communication start request" with the data stored in the subscriber data storage 18, and makes an authentication with respect to the subscriber ID (a) of the computer center 2.

If the check result is normal, the other call accept conditions such as changing of the subscriber data, number of reserved transmissions/exceeded reservation capacity and the like are checked. If these check results are also normal, the multi-media mail apparatus 1 returns a "communication start accept" to the computer center 2 via the computer communication controller 10 and establishes a logical path between the multi-media mail apparatus 1 and the computer center 2. The accept number (n) is included in the parameters of the "communication start accept". This accept number (n) is used later when the computer center 2 makes an inquiry of the transmission result of the message.

(5) Step S55: The computer center 2 transmits a "mode set request" with respect to the multi-media mail apparatus 1 when the "communication start accept" is received. The parameters of the "mode set request" include the message format (binary image/fixed text/non-fixed text/mixed text), the transfer mode (general transfer/page transfer), the total number of pages of the message, the starting page of the transmission/reception, the medium conversion, the compression technique, the pixel density, the paper size and the like.

In this particular case, the message format is a mixed text made up of the fixed text and the binary image, the transfer mode is the page transfer mode, and the medium conversion exists.

(6) Step S56: The computer communication controller 10 of the multi-media mail apparatus 1 starts the call controller 12 when the "mode set request" is received. Because the logical path is established, the call controller 12 starts the transfer mode controller 13. The transfer mode controller 13 reads the message format and the medium conversion of the "mode set request" and notifies the message format judging part 15 of the read message format and the existence of medium conversion.

The transfer mode controller 13 reads the transfer mode of the "mode set request" and makes the preparations for the data reception. In addition, the transfer mode controller 13 returns a "mode set accept" to the computer center 2 via the call controller 12 and the computer communication controller 10, and establishes the mode.

(7) Step S57: The computer center 2 reads the request sheet information from the file and makes a "data transfer" amounting to one page of the request sheet to the multi-media mail apparatus 1 when the "mode set accept" is received.

The parameters of the "data transfer" include the medium classification (binary image/fixed text/non-fixed text), the page number, the in-page segment number, the next medium classification, the next medium page number, the next medium in-page segment number, the partition (not last/last) and the like, and the data part follows these parameters.

In this particular case, it is assumed for the sake of convenience that the medium classification is the fixed text (request sheet information), the page number is "1", the in-page segment number is "1", the next medium classification is the binary image, the next medium page number is "2", the next medium in-page segment number is "1", and the partition is last (8) Step S58: The computer communication controller 10 of the multi-media mail apparatus 1 starts the call controller 12 when the "data transfer" is received. The call controller 12 starts the data transfer controller 14 via the transfer mode controller 13. The data transfer controller 14 makes a sequence check of the page number and the in-page segment number of the "data transfer", and notifies the medium classification judging part 16 of the medium classification and the message format judging part 15 of the next medium classification, the next medium page number and the next medium in-page segment number.

In this case, the partition of the "data transfer" is last (in-page last segment). Thus, the data transfer controller 14 returns a "reception acknowledge" to the computer center 2 via the transfer mode controller 13, the call controller 12 and the computer communication controller 10, so as to acknowledge the normal reception of the "data transfer".

The parameters of the "reception acknowledge" include the page number and the segment number.

(9) Step S59: The medium judging part 16 of the multi-media mail apparatus 1 starts the message format judging part 15 to confirm the existence of the medium conversion when it is recognized that the medium classification is the fixed text. If the medium conversion exists, the medium converter 17 is started. The medium converter 17 converts the format of the fixed text into the format of the request sheet, and stores the converted format into the data file.

(10) Step S60: The computer center 2 transmits a "mode set request" to the multi-media mail apparatus 1 when the "reception acknowledge" is received from the multi-media mail apparatus 1. In this case, the parameters of the "mode set request" include the general transfer mode as the transfer mode and "2" as the starting page of the transmission/reception.

(11) Step S61: The computer communication controller 10 of the multi-media mail apparatus 1 starts the call controller 12 when the "mode set request" is received. The call controller 12 starts the transfer mode controller 13 because the logical path is established.

The transfer mode controller 13 reads the transfer mode of the "mode set request" and makes the preparations for the data reception. In addition, the transfer mode controller 13 returns a "mode set accept" to the computer center 2 via the call controller 12 and the computer communication controller 10, and establishes the mode.

(12) Step S62: The computer center 2 reads the image information which was read by the scanner 3 and stored in the file when the "mode set accept" is received from the multi-media mail apparatus 1. The computer center 2 sets the medium classification to the binary image and makes a "data transfer" related to the second and subsequent pages with respect to the multi-media mail apparatus 1.

The computer communication controller 10 of the multi-media mail apparatus 1 starts the call controller 12 when the "data transfer" from the computer center 2 is received. The call controller 12 starts the data transfer controller 14 via the transfer mode controller 13.

The data transfer controller 14 makes a sequence check of the page number and the in-page segment number of the "data transfer", and notifies the medium judging part 16 of the medium classification and the message format judging part 15 of the next medium classification, the next medium page number and the next medium in-page segment number.

The data transfer controller 14 continues to receive the data if the partition of the "data transfer" is not last (in-page non-last segment). On the other hand, if this partition is last (in-page last segment), the data transfer controller 14 returns a "reception acknowledge" to the computer center 2 via the transfer mode controller 13, the call controller 12 and the computer communication controller 10, and acknowledges the normal reception of the "data transfer".

The parameters of the "reception acknowledge" include the page number and the segment number. The received data is stored in the data file.

(13) Step S63: The computer center 2 transmits the data related to the last page to the multi-media mail apparatus 1 in a manner similar to the above when the "reception acknowledge" related to the penultimate page (that is, [last page-1]) is received from the multi-media mail apparatus 1.

(14) Step S64: The multi-media mail apparatus 1 similarly returns a "reception acknowledge" to the computer center 2 when the data related to the last page is received from the computer center 2, and stores the received data in the data file.

(15) Step S65: The computer center 2 transmits a "communication end request" to the multi-media mail apparatus 1 when the "reception acknowledge" with respect to the "data transfer" related to the last page is received from the multi-media mail apparatus 1.

(16) Step S66: The computer communication controller 10 of the multi-media mail apparatus 1 starts the call controller 12 when the "communication end request" is received from the computer center 2. The call controller 12 returns a "communication end acknowledge" to the computer center 2 via the computer communication controller 10, and releases the logical path.

The call controller 12 starts the FAX/TEL communication controller 11, and requests that the message received from the computer center 2 be sent to the facsimile machine 6.

(17) Step S67: The FAX/TEL communication controller 11 calls the facsimile machine 6 via the public telephone network 8, and sends the message (request sheet and scanner input message) within the data file to the facsimile machine 6 in conformance with the facsimile communication procedure.

The process of sending the computer test and image information to the facsimile machine 6 is completed by the above described operation.

Figure 9:
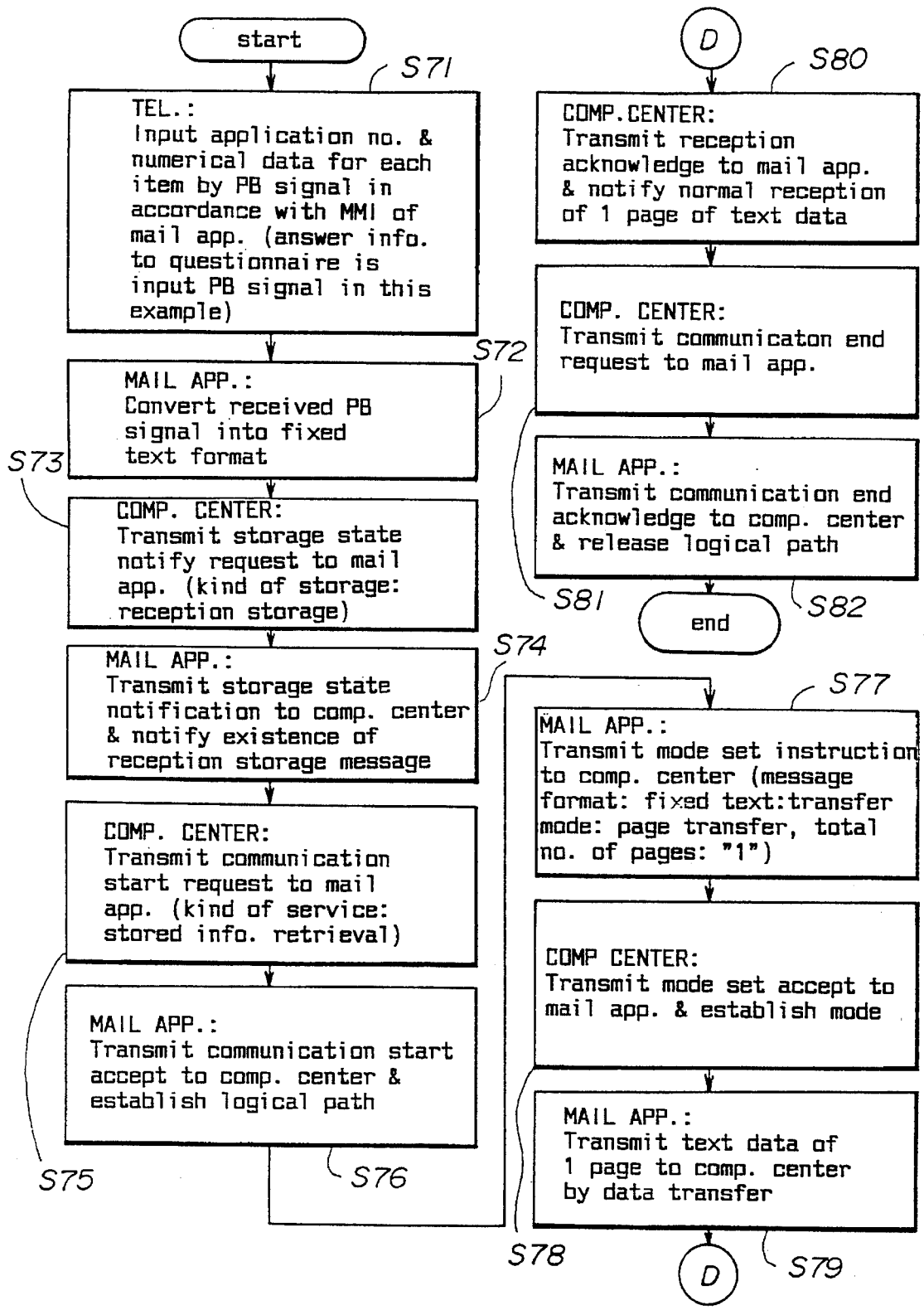
FIG. 9 is a flow chart for explaining the operation of the embodiment when entering a telephone PB signal into the computer.
Figure 15:
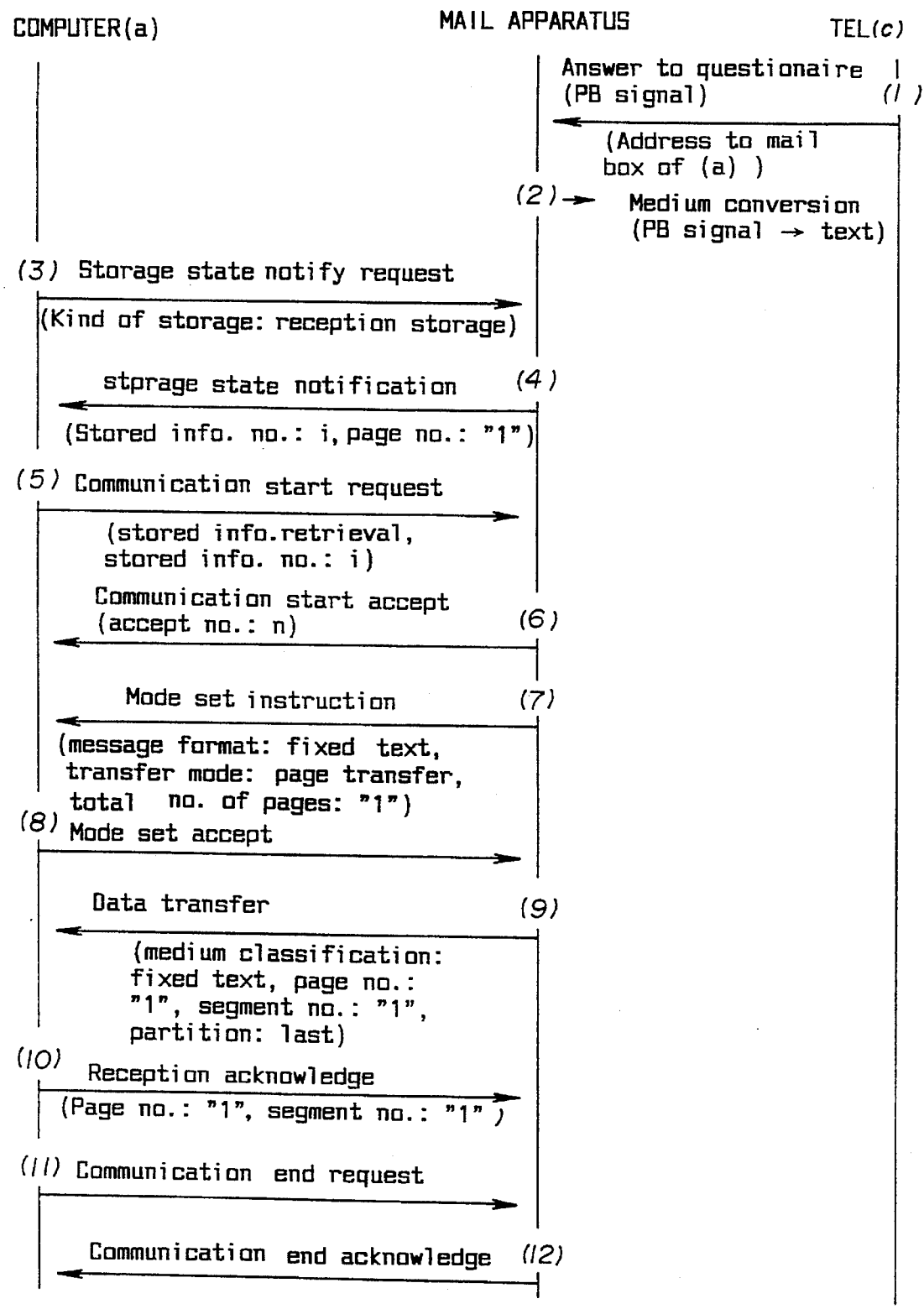
FIG. 15 is a sequence diagram for explaining the operation of the embodiment when entering the telephone PB signal into the computer.

[4] When entering telephone PB signal into the computer:

The operation of entering the telephone PB signal into the computer in this embodiment will be described with reference to the flow chart shown in FIG. 9 and the sequence diagram shown in FIG. 15.

(1) Step S71: A telephone subscriber (subscriber ID=c) of the multi-media mail apparatus 1 dials the telephone number of the multi-media mail apparatus 1 and connects to the multi-media mail apparatus 1 via the public telephone network 8.

The telephone subscriber inputs the subscriber ID and the password by using the PB signal in accordance with the voice guidance received from the FAX/TEL communication controller 11 of the multi-media mail apparatus 1.

The FAX/TEL communication controller 11 of the multi-media mail apparatus 1 refers to the subscriber data storage 18 and checks whether or not the service is requested from an acceptable subscriber. If the service request is acceptable, the FAX/TEL communication controller 11 requests the telephone subscriber to further input the application number and the like.

The telephone subscriber successively inputs the data with respect to each item by use of the PB signal in accordance with the voice guidance received from the FAX/TEL communication controller 11.

In this case, it is assumed for the sake of convenience that the application is an answer to a questionnaire.

(2) Step S72: The FAX/TEL communication controller 11 of the multi-media mail apparatus 1 starts the medium converter 17, and requests that the PB signals received from the telephone set 7 be converted into the format of the fixed text. The medium converter 17 converts the PB signals into the format of the fixed text for questionnaires.

The FAX/TEL communication controller 11 stores the data which is obtained by the medium conversion carried out by the medium converter 17 into a mail box which is within the message storage 19 and corresponds to the subscriber ID (a).

(3) Step S73: The computer center 2 transmits a "storage state notify request" to the multi-media mail apparatus 1, and makes a inquiry so as to determine whether or not a message has been received in the mail box corresponding to the computer center 2. The parameters of the "storage state notify request" include the subscriber ID, the password, the kind of storage (transmission storage/reception storage/confidential), the output apparatus and the like.

In this particular case, the reception storage is specified as the kind of storage.

(4) Step S74: The computer communication controller 10 of the multi-media mail apparatus 1 starts the call controller 12 when the "storage state notify request" is received. The call controller 12 checks the normality of the subscriber ID and the password of the "storage state notify request" by referring to the subscriber data storage 19.

If the check result is normal, the call controller 12 retrieves the mail box of the subscriber ID (a) within the message storage 19, and checks whether or not a message has been received and stored. The call controller 12 edits the retrieval result of the mail box to a "storage stage notification" and returns the "storage stage notification" to the computer center 2 via the computer communication controller 10.

The parameters of the "storage stage notification" include the kind of storage, the number of stored messages, the storage information number, the number of pages, the remote address and the like. In this particular case, it is assumed for the sake of convenience that the one message is stored as the reception storage message.

(5) Step S75: The computer center 2 transmits a "communication start request" to the multi-media mail apparatus 1 when the "storage state notification" is received from the multi-media mail apparatus 1 and it is recognized that there is one reception storage message.

The parameters of the "communication start request" include the kind of service (general communication/broadcast communication/stored information transmission/stored information retrieval, etc.), the remote address (telephone number, subscriber ID, broadcast list number), the number of stored information transmissions/receptions, the stored information number, the subscriber ID, the password and the like.

In this particular case, the kind of service is the stored information retrieval, and the stored information number is i.

(6) Step S76: The computer communication controller 10 of the multi-media mail apparatus 1 starts the call controller 12 when the "communication start request" is received from the computer center 2. The call controller 12 collates the subscriber ID and the password of the "communication start request" with the data stored in the subscriber data storage 18, and makes an authentication with respect to the subscriber ID (a) of the computer center 2.

If the check result is normal, the multi-media mail apparatus 1 returns a "communication start accept" to the computer center 2 via the computer communication controller 10. In addition, the multi-media mail apparatus 1 establishes a logical path and starts the transfer mode controller 11.

(7) Step S77: The transfer mode controller 13 transmits a "mode set instruction" to the computer center 2.

The parameters of the "mode set instruction" include the message format (binary image/fixed text/non-fixed text, mixed text), the transfer mode (general transfer/page transfer), the total number of pages of the message, the starting page of the transmission/reception, the medium conversion and the like.

In this particular case, the message format is the fixed text, the transfer mode is the page transfer mode, and the total number of pages is "1".

(8) Step S78: The computer center 2 returns a "mode set accept" to the multi-media mail apparatus 1 when the "mode set instruction" is received from the multi-media mail apparatus 1. In addition, the computer center 2 establishes the mode and starts the data transfer controller 14.

(9) Step S79: The data transfer controller 14 of the multi-media mail apparatus 1 reads the reception storage message having the storage information number which is specified by the "communication start request" from the mail box which is within the message storage 19 and corresponds to the subscriber ID (a). In addition, the data transfer controller 14 is notified of the message format from the message format judging part 15 and is notified of the medium classification in page apparatus/segment apparatus from the medium judging part 16.

The data transfer controller 14 sets the starting page of the transmission to "1", and makes a "data transfer" related to the data amounting to one page to the computer center 2 via the transfer mode controller 13, the call controller 12 and the computer communication controller 10.

The parameters of the "data transfer" include the fixed text as the medium classification, "1" as the page number, "1" as the segment number, and last as the partition.

(10) Step S80: The computer center 2 returns a "reception acknowledge" to the multi-media mail apparatus 1 when the "data transfer" amounting to one page is normally received from the multi-media mail apparatus 1. The data transfer controller 14 of the multi-media mail apparatus 1 recognizes the completion of the message transmission when the "reception acknowledge" is received from the computer center 2.

(11) Step S81: The computer center 2 transmits a "communication end request" to the multi-media mail apparatus 1.

(12) Step S82: The computer communication controller 10 of the multi-media mail apparatus 1 starts the call controller 12 when the "communication end request" is received from the computer center 2. The call controller 12 returns a "communication end acknowledge" to the computer center 2 via the computer communication controller 10, and releases the logical path.

The process of entering the telephone PB signal into the computer is completed by the above described operation.

In FIG. 5, the functions of each of the parts 10 through 19 forming the multi-media mail apparatus 1 may be realized by an information processing unit having a processor and a memory. In this case, the processor carries out the operations of the multi-media mail apparatus 1 shown in the flow charts of FIGS. 6 through 9.

According to this embodiment, the following advantages can be obtained when making a communication between the facsimile machine and the computer center via the multi-media mail apparatus.

First, the computer center and the multi-media mail apparatus can arbitrarily select the transfer mode to the general transfer mode, the page transfer mode or the combined transfer mode based on the attribute of the message. As a result, it is possible to realize an efficient data transfer.

Second, the computer center can change the transfer mode which is specified by the multi-media mail apparatus when retrieving the message which has been received and stored within the multi-media mail apparatus. For this reason, the computer center can take the initiative with regard to the reception, such as determining whether or not to receive the message after receiving only one or two pages of the message and confirming the contents of the message.

Third, the computer center can retrieve the message which has been received from the facsimile machine and stored in the multi-media mail apparatus at an arbitrary timing. Therefore, the scheduling of the transmitting and receiving processes of the computer center can be carried out with ease.

Further, the present invention is not limited to these embodiments, but various variations and modifications may be made without departing from the scope of the present invention.

What is claimed is:

1. A multi-media information transfer system for transferring information between a computer center and a multi-media mail apparatus which is coupled to a communication network, said multi-media information transfer system comprising:

first means, provided in the computer center and the multi-media mail apparatus, for specifying a transfer mode to be one of: (a) a general transfer mode in which a plurality of pages are transferred together in response to one instruction of a transfer format, (b) a page transfer mode in which the transfer is made one page at a time by instructing the transfer format of each page, and (c) a combined transfer mode in which the general transfer mode and the page transfer mode are combined depending on whether information which is to be transferred;

second means, provided in the multi-media mail apparatus, for storing information which is received from the computer center and the communication network; and third means, provided in the computer center and the multi-media mail apparatus, for transferring the information between the computer center and the multi-media mail apparatus in the transfer mode specified by said first means, wherein said third means includes means for transmitting attribute information related to information which is to be transmitted next, and means for specifying an appropriate transfer mode for the next information depending on the attribute information.

2. The multi-media information transfer system as claimed in claim 1, which further comprises fourth means, provided in the multi-media mail apparatus, for transferring the information between the multi-media mail apparatus and the communication network.

3. The multi-media information transfer system as claimed in claim 2, wherein the information has a format selected from a group consisting of a binary image, a fixed text, a non-fixed text, and a mixed text.

4. The multi-media information transfer system as claimed in claim 3, which further comprises fifth means, provided in the multi-media mail apparatus, for judging the format of the information, and sixth means, provided in the multi-media mail apparatus, for converting the format of the information which is transferred depending on a judgement result of said fifth means.

5. The multi-media information transfer system as claimed in claim 1, wherein said second means stores the information which is received from the computer center and is to be transferred to the communication network.

6. The multi-media information transfer system as claimed in claim 1, wherein said second means stores the information which is received from the communication network and is to be transferred to the computer center.

7. The multi-media information transfer system as claimed in claim 6, which further comprises fourth means, provided in the computer center, for retrieving the information stored in said second means at an arbitrary time.

8. The multi-media information transfer system as claimed in claim 7, wherein said third means includes means for transferring the information from the multi-media mail apparatus to the computer center by changing the transfer mode specified by multi-media mail apparatus in response to an instruction from the computer center.

9. The multi-media information transfer system as claimed in claim 1, which further comprises input/output means, coupled to the computer center, for inputting/outputting the information which is transferred from/to the computer center.

10. The multi-media information transfer system as claimed in claim 1, wherein the communication network is coupled to at least a telephone set and a facsimile machine.

11. The multi-media information transfer system as claimed in claim 1, wherein said first means specifies the general transfer mode as the transfer mode when the information to be transferred have the same medium classification and the same transmitting conditions, so that the transfer format only needs to be specified once prior to the information transfer.

12. The multi-media information transfer system as claimed in claim 1, wherein the attribute, which is the same for said plurality of pages being transferred together when said transfer mode is specified as said general transfer mode, is at least a medium classification, a compression technique, a pixel density and a paper size.

* * * * *